United States Patent [19]

Imoto et al.

[11] Patent Number: 4,880,289
[45] Date of Patent: Nov. 14, 1989

[54] TWO-WAY OPTICAL TRANSMISSION SYSTEM

[75] Inventors: Katsuyuki Imoto, Sayama; Akihiko Takase, Koganei; Atsushi Takai, Kodaira; Satoshi Aoki, Chigasaki; Tsutomu Yoshiya, Yokohama; Shoji Yamada, Kamakura, all of Japan

[73] Assignee: Hitachi, Ltd., Tokyo, Japan

[21] Appl. No.: 682,311

[22] Filed: Dec. 17, 1984

[30] Foreign Application Priority Data

| Dec. 16, 1983 [JP] | Japan | 58-236159 |
| Mar. 23, 1984 [JP] | Japan | 59-54233 |
| Mar. 29, 1984 [JP] | Japan | 59-61865 |
| Mar. 30, 1984 [JP] | Japan | 59-60675 |

[51] Int. Cl.$^4$ .............................................. G02B 6/32
[52] U.S. Cl. ........................... 350/96.18; 350/96.16; 370/1; 455/610
[58] Field of Search ............. 350/96.15, 96.16, 96.18, 350/96.19, 96.20; 370/1, 3; 455/610, 612

[56] References Cited

U.S. PATENT DOCUMENTS

| 3,953,727 | 4/1976 | D'Auria et al. | 370/3 |
| 4,213,677 | 7/1980 | Sugimoto et al. | 350/96.18 |
| 4,244,045 | 1/1981 | Nosu et al. | 370/3 |
| 4,289,373 | 9/1981 | Sugimoto et al. | 350/96.16 |
| 4,304,460 | 12/1981 | Tanaka et al. | 350/96.16 |
| 4,456,329 | 6/1984 | Henderson et al. | 350/96.16 |
| 4,474,424 | 10/1984 | Wagner | 350/96.16 |
| 4,651,315 | 3/1987 | Laude | 370/3 |
| 4,653,042 | 3/1987 | D'Auria et al. | 370/3 |
| 4,708,425 | 11/1987 | Gouali et al. | 350/96.16 |

FOREIGN PATENT DOCUMENTS

| 55-117114 | 9/1980 | Japan | 350/96.18 |
| 59-160116 | 9/1984 | Japan | 350/96.20 |

OTHER PUBLICATIONS

Miyazaki et al., "Optical Multiplexer/Demultiplexers Using Thin-Film . . .," *Fujitsu Sci. & Tech. J.* (Japan), vol. 16, No. 4, 1980, pp. 17–36.

Koonen et al., "Optical Devices For Wavelength Division/Multiplexing . . .," *Philips Telecom. Review*, vol. 40, No. 2, Jul. 1982, p. 9.

Tanaka et al., "Fiber-Optic Multifunction Devices Using a Single GRIN . . .," *Applied Optics*, vol. 21, No. 19, Oct., 1982, pp. 3423–3426.

Fujii et al., "Practical Two-Wavelength Multi-Demultiplexer . . .," *Applied Optics*, vol. 22, No. 19, Oct. 1983, pp. 3090–3097.

*Primary Examiner*—John D. Lee
*Attorney, Agent, or Firm*—Antonelli, Terry & Wands

[57] ABSTRACT

A two-way optical transmission system in which a plurality of light signals of wavelengths differing one from another are transmitted through a single optical fiber from one end thereof to the other end and from the other end to the one end. One or more assemblies each including an electrooptic transmitter, a dielectric thin-film filter and a rod lens and one or more assemblies each including a rod lens, a dielectric thin-film filter and an opto-electric receiver are connected to the single optical fiber at both ends thereof, respectively.

20 Claims, 16 Drawing Sheets

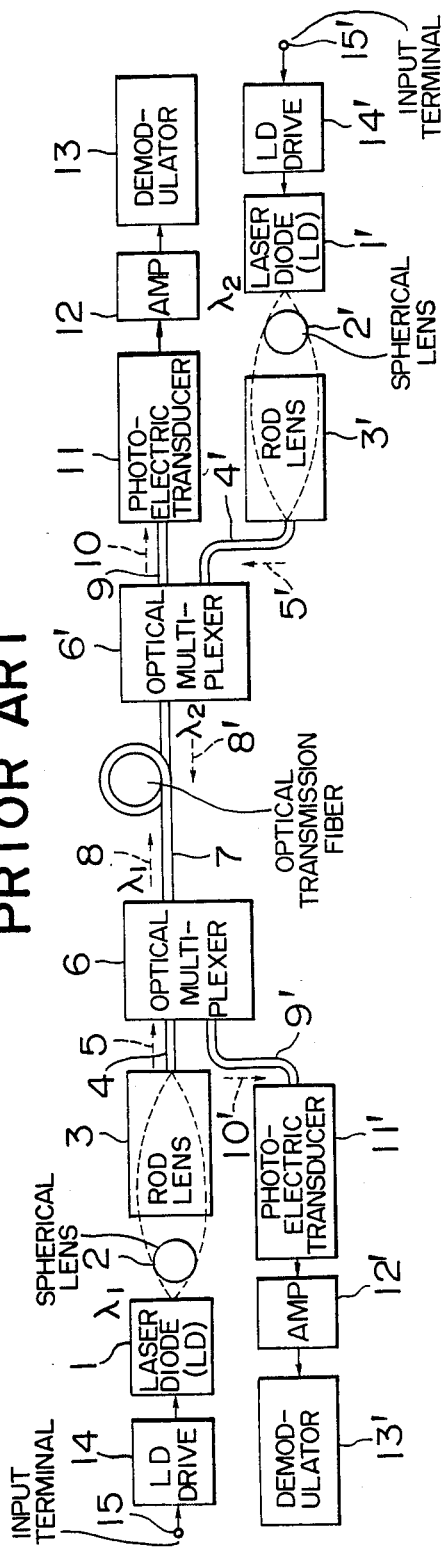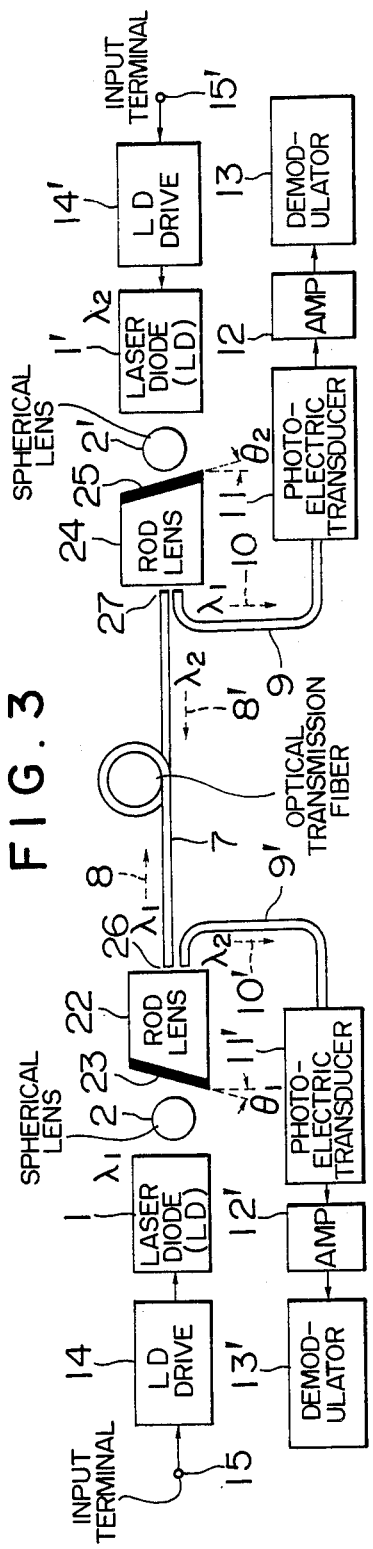

23a

23b

25a

25b

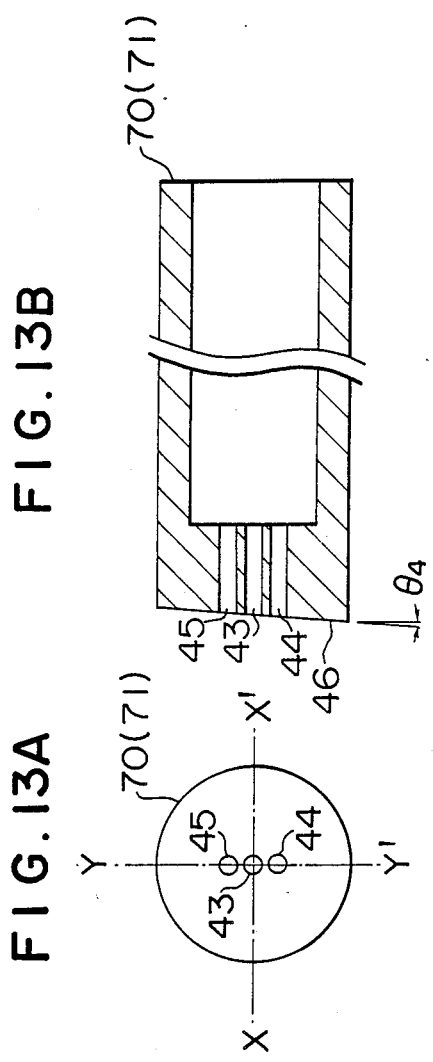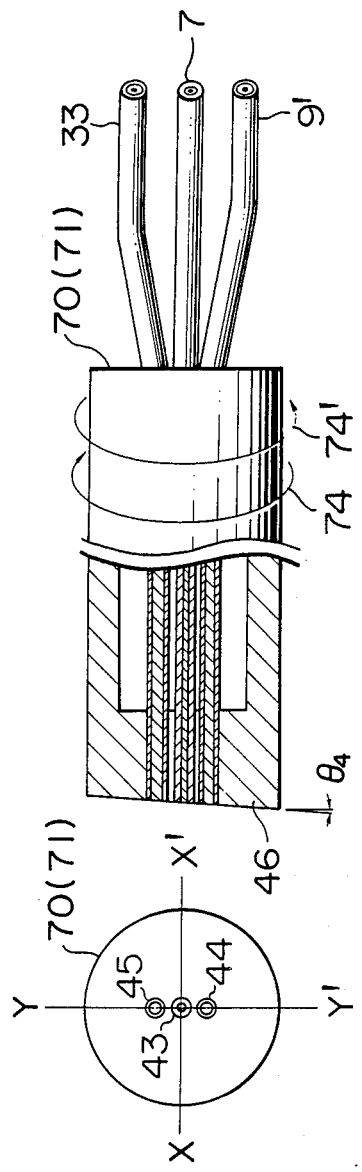

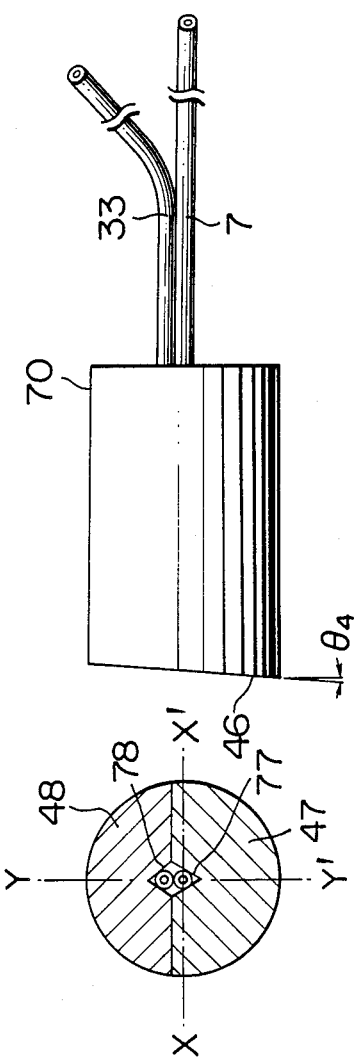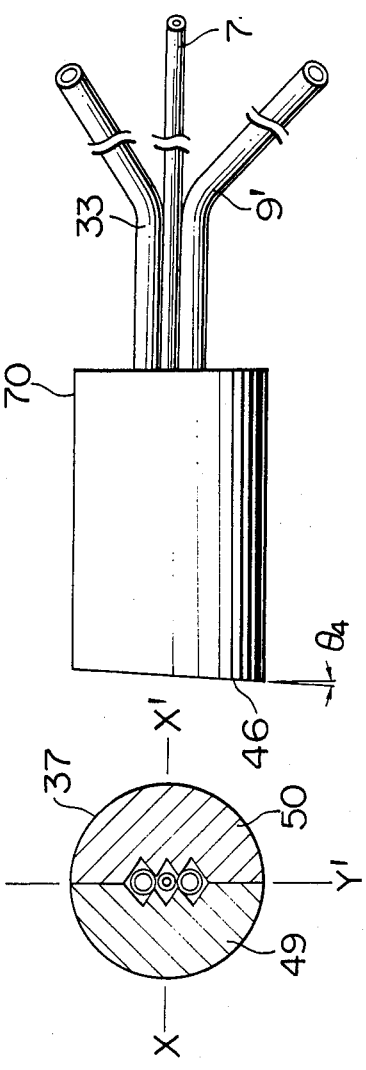

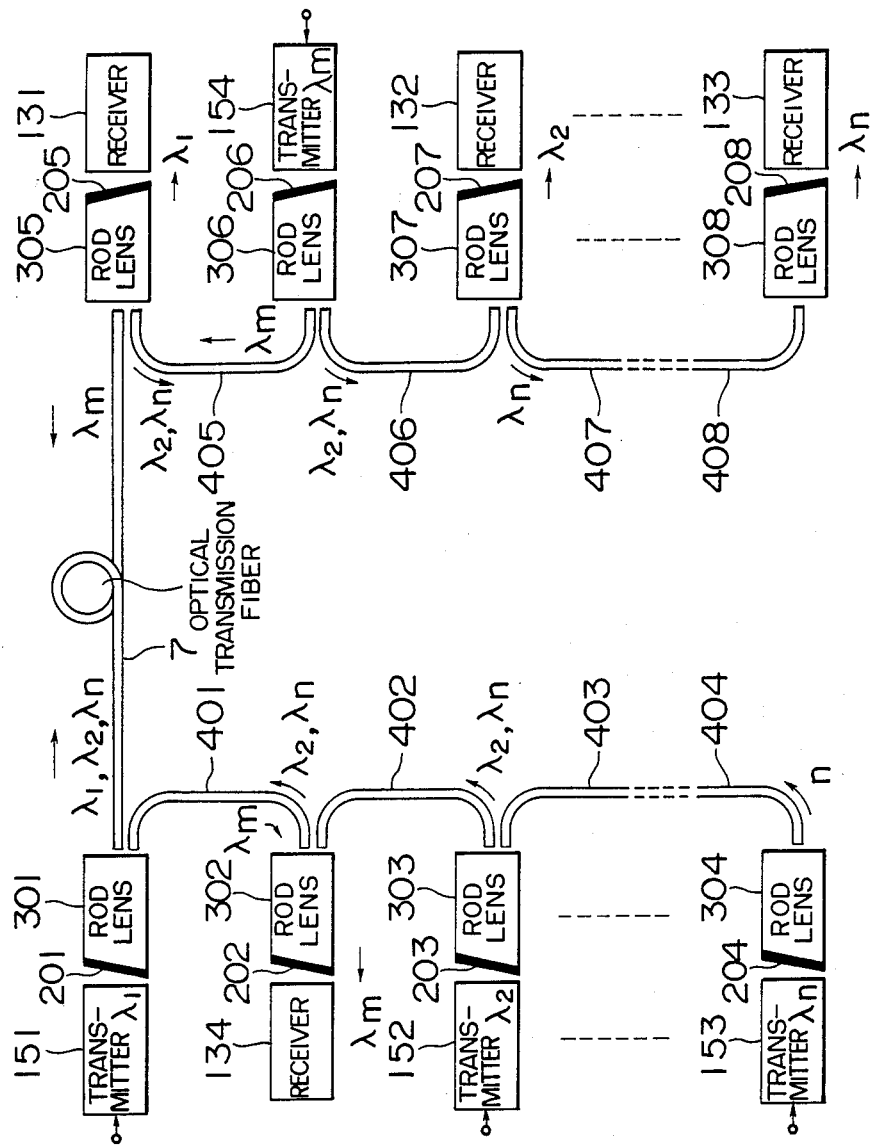

TWO-WAY OPTICAL TRANSMISSION SYSTEM

BACKGROUND OF THE INVENTION

1. Field of the Invention

The present invention relates to a bidirectional or two-way optical transmission system designed and suited for transmission light signals of wavelengths differing from one another in up-link and down-link directions, respectively, by using a single optical fiber transmission line.

2. Description of the Prior Art

The analogue transmission system in which a semiconductor laser diode (hereinafter referred to as laser diode or LD) is employed promises to be applicable to the transmission of image information or data of industrial television, high-quality television, cable television and the like systems. However, in the transmission system in which the laser diode is used in combination with a multi-mode optical fiber, there arises a problem that so-called speckle noise and speckle distortion appear due to mutual interference among different transmission modes of laser light because of the interferential nature thereof. For this reason, the possible maximum transmission distance is limited to a range of 1 to 2 km at best in the present state of the art. In contrast, in a transmission system in which the laser diode is used in combination with a single-mode optical fiber, the speckle noise and speckle distortion mentioned above can be evaded, whereby a long distance transmission around 10 km is expected to be realized. It should however be pointed out that in the transmission system employing the single-mode optical fiber, the two-way transmission has not yet been realized at present, which can be explained by the facts that the optical multiplexer of low loss is difficult to be realized and that the transmission system has a very complicated structure and suffers from degradation in the transmission quality, low reliability and is very expensive.

FIG. 1 of the accompanying drawings shows a general arrangement of a two-way optical transmission system which is realized by using those devices and components which are commercially available at present. Referring to FIG. 1, it is assumed that the path of a light signal (of wavelength $\lambda_1$) propagating through an optical fiber 7 in the direction indicated by an arrow 8 is referred to as an up-link, while the path of a light signal (of wavelength $\lambda_2$) traveling in the direction indicated by an arrow 8' is termed the down-link. In the up-link circuit, a signal applied to information or data input terminal 15 is supplied to a laser diode drive circuit 14 (hereinafter also referred to as LD drive circuit). A laser diode or LD 1 is driven by the output signal of the LD drive circuit 14. The oscillation wavelength of the LD 1 is represented by $\lambda_1$. The laser light emitted by the LD 1 passes through a spherical lens 2 and a graded index (GRIN) rod lens 3 (having a length of about ¼ pitch, where one pitch corresponds to a period of a meandering optical path within the rod lens) and enters an optical fiber 4. Having traveled in the direction indicated by an arrow 5, the laser light reaches an optical multiplexer 6. The output light signal from the optical multiplexer 6 travels through the optical fiber 7 in the direction indicated by the arrow 8 to reach a photoelectric or optoelectric receiver 11 after having passed through an optical multiplexer 6' and an optical fiber 9. The electric output signal produced by the receiver 11 is, after having been amplified by an amplifier 12, demodulated by a demodulator 13, whereby the original information or data signal is reproduced. In the case of the down-link circuit, a signal applied to a data input terminal 15' is applied to a laser diode drive circuit 14', the output signal of which drives a laser diode or LD 1' which then oscillates at the wavelength $\lambda_2$. The laser light emitted by the LD 1' travels through a spherical lens 2', a graded index (GRIN) type rod lens 3' (having a length of about ¼ pitch), an optical fiber 4', an optical multiplexer 6', the optical fiber 7 and then the optical multiplexer 6 in this order and reaches a photoelectric receiver 11' through an optical fiber 9', as indicated by an arrow 10'. A corresponding electric signal produced by the receiver 11' is amplified by an amplifier 12' and subsequently demodulated by a demodulator 13' to the original data signal. As will be seen, the transmission system described above requires a great number of devices or components. Among them, the optical multiplexers, the spherical lenses and the graded index type rod lenses have to be provided in pairs, respectively. Besides, adjustment for alignment of the optical axes of the individual components is obviously very troublesome, involving difficulties in implementing the optical transmission system with low loss and high reliability at reasonable costs. Furthermore, reflected light rays from the various devices or elements will possibly be re-injected into the LD, bringing about changes in the longitudinal mode which in turn will produce crosstalk noise. To evade such unwanted phenomenon, corresponding measures must be taken against the light reflections by the various devices, which means that the system structure will then be considerably complicated.

FIG. 2 shows a typical structure of the hitherto known optical multiplexer corresponding to the one denoted by the numerals 6 and 6' in FIG. 1. Referring to FIG. 2, the light of wavelength $\lambda_1$ traveling through the optical fiber 4 in the direction indicated by an arrow 5 is applied to a rod lens 17 and hence to a pentagonal prism 21 in which the light is reflected by a dielectric mirror 19 to a dielectric thin-film filter 20 at which the light is again reflected toward a rod lens 18. The light signal leaving the rod lens 18 travels through the optical fiber 7 in the direction indicated by an arrow 8. On the other hand, light of wavelength $\lambda_2$ propagates through the optical fiber 7 in the direction indicated by an arrow 8' and passes through a dielectric thin-film filter 20 to be transmitted through a rod lens 16 to the optical fiber 9' in which the light signal travels in the direction indicated by an arrow 10'. In this way, the light signal of wavelength $\lambda_1$ and the light signal of wavelength $\lambda_2$ are separated or demultiplexed from each other. However, the optical multiplexer shown in FIG. 2 requires a great number of optical elements and a complex structure, presenting an obstacle to the realization at low costs and with high reliability. Further, because of the single-mode transmission, the core diameter of the optical fiber has to be smaller than 10 $\mu$m, whereby extremely strict accuracy requirements are imposed with regard to the positioning of the optical fibers. As the loss of the optical multiplexer itself as well as loss involved in the couplings between the LD and the lens, between the lens and the optical fiber and between the optical fiber and the optical multiplexer is increased, the transmission distance is correspondingly shortened, making it difficult to realize a long distance transmission. For the reasons described above, the two-way optical transmission system in which a single-mode optical fiber is used is not yet realized for practical applications. By the way, in the one-way transmission system, the transmission distance is only around 5 km.

SUMMARY OF THE INVENTION

An object of the present invention is to realize a two-way optical transmission system in an extremely simplified structure in which a single-mode optical fiber can be employed, to thereby make possible a long distance data transmission.

In view of the above object, there is provided according to a general aspect of the present invention a two-way optical transmission system in which data transmission is carried out by using light signals of different wavelengths in the up-link direction and the down-link direction, respectively, through a first single optical fiber, wherein light of a wavelength $\lambda_1$ transmitted from a light signal transmitter of the up-link circuit is introduced to the first single optical fiber at one end thereof through a dielectric thin-film filter which passes therethrough only the light of wavelength $\lambda_1$ and a rod lens, while light of wavelength ($\lambda_2$) transmitted from a light signal transmitter of the down-link circuit is introduced to the first single optical fiber at the other end through a dielectric thin-film filter which passes only the light of the wavelength $\lambda_2$ and a rod lens. The light beams of the different wavelengths $\lambda_1$ and $\lambda_2$ leaving the aforementioned single optical fiber are reflected, respectively, by the two dielectric thin-film filters mentioned above to enter second optical fibers disposed, respectively, adjacent to the end faces of the rod lenses which are located, respectively, at the ends of the first optical fiber. The information signal is introduced to the light signal receiver through the associated second optical fiber to be demodulated.

According to the invention, the rod lens which serves to introduce light emitted by a light emission element into the single optical fiber is provided with the dielectric thin-film filter for effecting the two-way transmission, as the result of which the heretofore required optical multiplexer of the complicated structure can be spared. In other words, the present invention proposes a novel two-way optical transmission system in which both the function of coupling light emitted by the light emission element to the optical fiber and the function of the optical multiplexer/demultiplexer are realized by the single rod lens. Accordingly, the two-way optical transmission system according to the invention is of an extremely simplified structure and can enjoy a significant loss reduction and hence a long distance transmission. By the way, with the phrase "oscillation wavelength ($\lambda_1$, $\lambda_2$)" it is intended to mean the center wavelength of oscillation. The length of the rod lens is about n/4 pitch (where n=1, 3, 5 ... ).

According to a preferred embodiment of the invention, a two-way transmission in which three or more different light wavelengths are made use of can be realized by providing the three or more optical transmitter units and optical receiver units, respectively, which are mutually interconnected by the optical fibers in the manner described above.

In this conjunction, a plurality of the dielectric thin-film filters which exhibit different optical characteristics (transmission and reflection characteristics), respectivly, may be provided in n layers with angles $\theta_n$ which differ for the n layers, respectively, at an end face of the rod lens which is located on the entrance side of the light emitter by the light emission element or LD. On the other hand, the opposite end face of the rod lens is coupled with one end of n optical fibers in addition to the single optical fiber serving for the up- and down-transmission of the signals. The other ends of n optical fibers are coupled to optical transmitter or receiver units for transmitting or receiving light signals of other oscillation wavelengths. In this way, there can be realized the two-way transmission of three or more light signals of the wavelengths which differ from one another.

The present invention can be applied not only to the single-mode optical fiber transmission system but also to a multi-mode optical fiber transmission system.

It is also another object of the present invention to simplify the adjustment required for the coupling between the optical fiber and the optical transmitter unit or optical receiver unit, to thereby reduce the time taken for the adjustment and realize a high degree of coupling, inexpensiveness and reduction in loss.

In view of the object mentioned above, it is proposed according to another aspect of the invention that an optical fiber holding means is provided on the light exit side of the rod lens, wherein the optical up- and down-transmission fiber having the end disposed at the rod lens and one or more optical fibers juxtaposed around the former for transmitting light signals demultiplexed or multiplexed by the dielectric thin-film filter are fixedly secured integrally on the light exit side of the optical fiber holding means. According to a further feature of the present invention, the rod lens provided with one or more dielectric thin-film filters may be combined with the optical fiber holding means to thereby constitute an optical module which is disposed at the optical (electrooptic) transmitters of the up-link circuit and the down-link circuit, respectively. The optical fiber holding means is so constituted that it accommodates therein the optical fiber for transmitting the light signal passing through the dielectric thin-film filter and the optical fiber for transmitting the light signal demultiplexed or multiplexed through the dielectric thin-film filter, wherein each fiber is coupled with the transmission path and the transmitter or the receiver to thereby effect the two-way transmission of two or more light signals of different wavelengths.

It is a further object of the present invention to provide a structure of the optical module for the two-way transmission which can be packaged with an improved accuracy without consuming time. With the invention, it is also contemplated to provide a method of manufacturing the optical module.

In view of the above object, it is proposed according to another aspect of the invention that one end face of the rod lens is ground slant at a desired angle, and that upon formation of the dielectric thin-film filter on the ground end face, a mark indicating that the grinding has been effected along the Y—Y' axis of that end face is left on the end face of the rod lens or alternatively the rod lens is previously inserted and secured within a cylindrical tube which has a mark on the Y—Y' axis and subsequently the grinding and the formation of the dielectric thin-film are performed with reference to the mark. A receptacle base is prepared which allows the packaging and assembling to be carried out with reference to the mark, to thereby realize the optical module for the two-way optical transmission.

BRIEF DESCRIPTION OF THE DRAWINGS

FIG. 1 is a schematic view showing a general arrangement of a two-way optical transmission system which is composed of hitherto known devices or components;

FIG. 3 is a view showing schematicallly a general arrangement of a two-way optical transmission system according to an exemplary embodiment of the present invention;

FIGS. 13A and 13B are views for illustrating a structure of an optical fiber holder used in the system shown in FIG. 12;

FIGS. 14A and 14B are views corresponding to FIGS. 13A and 13B and show the optical fiber holder in the state in which optical fibers are inserted in the holder;

FIGS. 15A, 15B, 16A and 16B show, respectively, other possible structures of the optical fiber holder according to further embodiments of the invention;

FIG. 25 is a block diagram showing an arrangement of a two-way optical transmission system according to a further embodiment of the present invention.

DESCRIPTION OF THE PREFERRED EMBODIMENTS

Figure 2:
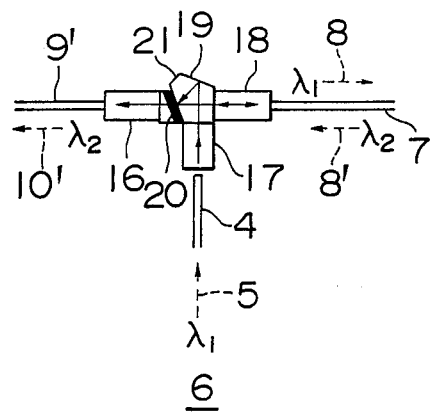
FIG. 2 is a schematic view showing a structure of a hitherto known optical multiplexer.

FIG. 3 shows a general arrangement of a two-way optical transmission system according to an exemplary embodiment of the present invention. This system differs from the one shown in FIG. 1 in that each rod lens 22 or 24 having a length of about ¼ pitch is ground slant or bevelled (i.e. with inclination) at one or both ends, wherein a dielectric thin-film filter 23 or 25 imparted with desired optical charcteristics is formed on the one ground end face, and two optical fibers are disposed closely adjacent to each other at the other end face of the rod lens, and that the optical multiplexers 6 and 6' are omitted in the two-way transmission system shown in FIG. 3. The filter 23 is constituted by a multi-layer dielectric film which passes light of a wavelength $\lambda_1$ and reflects light of another wavelength $\lambda_2$. On the other hand, the filter 25 is constituted by a multi-layer dielectric film which reflects the light signal of the wavelength $\lambda_1$ while transmitting the light signal of the wavelength $\lambda_2$. The filter may be realized in a band pass filter or a short wavelength band (or long wavelength band) pass filter.

Next, operation of the two-way optical transmission system shown in FIG. 3 will be described. The laser light (of wavelength $\lambda_1$) emitted by a light emission element or laser diode (LD) 1 is collimated by a spherical lens 2 and enters the dielectric thin-film filter 23. In the case of the illustrated system, the light emission element 1 and the spherical lens 2 constitute an optical (i.e. electrooptical) transmitter. Light signal incident on the dielectric thin-film filter 23 passes therethrough and travels through the rod lens 22 to be focused into an optical fiber 7 for transmission therethrough in the direction indicated by an arrow 8 and enters the rod lens 24. The light of wavelength $\lambda_1$ incident upon the rod lens 24 reaches the dielectric thin-film filter 25 to be reflected thereby. The reflected light is reversely directed and focused onto the entrance end face 27 of the rod lens 24 at a position which is deviated from the light entrance or incidence position by a distance corresponding to an angle $\theta_2$ at which the end face of the rod lens covered with the dielectric thin-film filter 25 is slanted. Thus, by positioning the inlet port of an optical fiber 9 at the position where the reflected light of wavelength $\lambda_1$ is focused, the reflected light signal travels through the core of the optical fiber 9 in the direction indicated by an arrow 10 to be received by a photoelectric or optoelectric transducer 11 whose electrical output signal is amplified by an amplifier 12 and finally demodulated to an original information or data signal by a demodulator 12'. It should be mentioned that in the case of the illustrated system, the photoelectric or optoelectric transducer 11, the amplifier 12 and the demodulator 13 constitute an optoelectric or optical receiver. On the other hand, the laser light of the wavelength $\lambda_2$ is collimated by means of a spherical lens 2' and enters the dielectric thin-film filter 25 which passes the incident light. The light signal having passed the filter 25 travels through the rod lens 24 and is focused into a core of the optical fiber 7 disposed closely adjacent to the end face 27 of the rod lens 24 to travel through the optical fiber 7 in the direction indicated by an arrow 8' and enter the rod lens 22. The light signal incident on the rod lens 22 reaches the dielectric thin-film filter 23 to be reflected thereby toward the end face 26 of the rod lens 22. The reflected light is focused onto the end face 26 at a position which is deviated from the position of the incident light by a distance corresponding to an angle $\theta_1$ at which the end face of the rod lens 22 covered with the filter film 23 is bevelled or inclined. By positioning the core of an optical fiber 9' at a point where the reflected light is focused, the reflected light of wavelength $\lambda_2$ leaving the rod lens 26 is transmitted through the optical fiber 9' in the direction indicated by an arrow 10' to be received by a photoelectric or optoelectric transducer 11' whose output signal is demodulated to the original data signal by a demodulator 13' after having been amplified by an amplifier 12'.

As will be seen from the above description, the two-way optical transmission system according to the invention in which light signals of different wavelengths are used can be realized in an extremely simplified structure as compared with the arrangement of the two-way transmission system shown in FIG. 1. This transmission system is advantageous in that the number of the requisite component devices is significantly decreased, low-loss transmission can be attained, troublesome adjustment for the optical axis alignment is reduced in frequency, and that the present system promises realization of a long distance transmission. Additionally, by virtue of such feature that the rod lens (22, 24) is cut slant at one or both ends thereof, the light reflected at the slanted end face of the rod lens as well as light reflected at the end face of the optical fiber is positively prevented from being re-injected to the light emission element or LD to an advantage, as the result of which the crosstalk noise can be effectively suppressed to another advantage. The angles $\theta_1$ and $\theta_2$ may be selected in a range of a fraction to thirties in degree. It will be understood that as the angle is selected larger, the distance between the juxtaposed optical fibers 7 and 9' (or 9) can be increased. In other words, the distance between the juxtaposed optical fibers is in proportion to the angle mentioned above. By selecting the angle $\theta_1$ equal to $\theta_2$, the rod lens is implemented in a configuration symmetrical to the central vertical axis as viewed in the drawing. Further, in case the dielectric thin-film filter (23, 25) is implemented in a band pass filter, transmission of unwanted light signals through the optical fiber can be effectively suppressed by narrowing extremely the bandwidth of the filter. (To this end, a plural stages of filters may be connected in cascade or filters may also be provided on the reflected light transmitting end faces 26 and 27 of the rod lenses 22 and 24.) The above description has been made on the assumption that the single-mode optical fiber is employed. However, the invention can be equally applied to the system in which a multi-mode optical fiber is adopted. Further, a light emission diode (LED) may be employed as the light emission element in place of the laser diode (LD).

In another version of the transmission system shown in FIG. 3, it is possible to use a single-mode optical fiber only for the optical transmission fiber 7, while a multi-mode optical fiber of a large core diameter can be used as the optical fibers 9 and 9', provided that the length of the latter is within several meters. In that case, the amount of light input to the photoelectric transducer of the receiver can be increased. In another modification, the optical fibers 9 and 9' may be removed by disposing the photoelectric transducers 11 and 11' in front of the associated end faces 26 and 27 of the rod lenses 22 and 24 at the focal points of the reflected light, respectively, with or without interposition of lenses. In that case, an integral transmitter/receiver module for the two-way optical transmission can be realized in which the laser diode (LD) and the photoelectric transducer are integrally incorporated. In should be added that the distance between the end face of the laser diode 1 and the spherical lens 2 is selected equal to the focal length of the spherical lens 2 and the distance between the spherical lens 2 and the rod lens 22 is selected equal to the sum of the focal lengths of these lenses. Same applies true to the distance between the LD 1' and the spherical lens 2' and the distance between the spherical lens 2' and the rod lens 24. The focal lengths of the spherical lenses and the rod lenses are determined in dependence on the spot size of the optical fiber and the diameter of light beam emitted by the laser diode.

Figure 4:
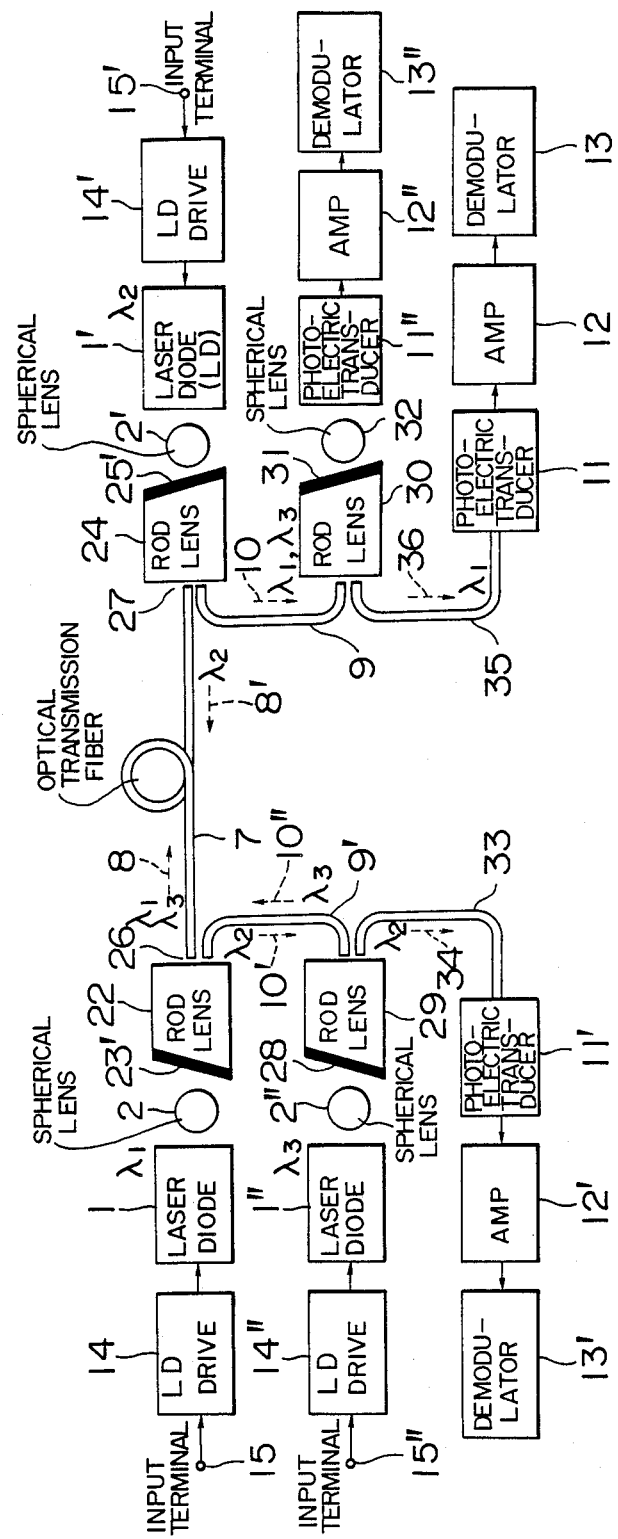
FIG. 4 is a view similar to FIG. 3 and shows a two-way optical transmission system according to another embodiment of the invention.

FIG. 4 shows a two-way optical transmission system according to another embodiment of the invention which is designed for the two-way transmission of three light signals differing from one another in the wavelength. More specifically, the two-way optical transmission system shown in FIG. 4 is so arranged that a light signal of wavelength $\lambda_1$ originating in a laser diode or LD 1 and a light signal of wavelength $\lambda_3$ originating in a LD 1" are transmitted through an optical fiber 7 in the direction indicated by an arrow 8 (up-link direction), while a light signal of wavelength $\lambda_2$ emitter by a LD 1' is transmitted through the optical fiber 7 in the direction indicated by an arrow 8' (downlink direction). In this arrangement, a dielectric thin-film filter 23' is so designed as to pass the light of wavelength $\lambda_1$ while reflecting the light signals of the wavelengths $\lambda_2$ and $\lambda_3$. On the other hand, a dielectric thin-film filter 25' is designed to pass only the light of wavelength $\lambda_2$ and reflect the light signals of wavelengths $\lambda_1$ and $\lambda_3$. A dielectric thin-film filter 28 passes the light of wavelength $\lambda_3$ and reflects the light of wavelength $\lambda_2$. Further, a dielectric thin-film filter 31 is designed to pass the light of wavelength $\lambda_3$ and reflect the light of wavelength $\lambda_1$.

Next, operation of the two-way optical transmission system shown in FIG. 4 will be described.

The light signal of wavelength $\lambda_1$ emitted by the laser diode or LD 1 is transmitted through the optical fiber 7 in the direction indicated by the arrow 8, as mentioned above, and reflected by the dielectric thin-film filter 25' deposited on the end face of the rod lens to enter the optical fiber 9 to be transmitted therethrough in the direction indicated by the arrow 10. The light leaving the optical fiber 9 enters the rod lens 30 and undergoes reflection at the dielectric thin-film filter 31 to be subsequently transmitted through the optical fiber 35 in the direction indicated by an arrow 36 and received by the photoelectric transducer 11 whose output signal is amplified by the amplifier 12 and then demodulated to the data signal by the demodulator 13. On the other hand, the light signal of wvelength $\lambda_3$ emitted by the LD 1" is introduced to the optical fiber 9' in the focused state after having passed through the spherical lens 2", the dielectric thin-film filter 28 and the rod lens 29, to be transmitted through the optical fiber 9' in the direction indicated by an arrow 10"0 to enter the rod lens 22. The light signal reaches the dielectric thin-film filter 23' and is reflected to the optical fiber 7 to be transmitted to the dielectric thin-film filter 25' as in the case of the light of wavelength $\lambda_1$. The light signal ($\lambda_3$) is reflected by the filter 25' to be coupled to the optical fiber 9 and transmitted to the photoelectric transducer 11" through the rod lens 30, the dielectric thin-film filter 31 and the spherical lens 32. The output signal of the photoelectric transducer 11" is demodulated to the data or information signal by the demodulator 13" after having been amplified by the amplifier 12". Finally, the light signal of wavelength $\lambda_2$ sent out from the LD 1' is transmitted through the optical fiber 7 in the direction indicated by a broken line arrow 8' to be reflected by the dielectric thin-film filter 23' to the optical fiber 9' through which the light signal $\lambda_2$ is transmitted in the direction indicated by a broken line arrow 10' to be again reflected by the dielectric thin-film filter 28, whereby the light signal $\lambda_2$ is transmitted through the optical fiber 33 in the direction indicated by a broken line arrow 34 to reach the photoelectric transducer elemnent 11'. Through the photoelectric conversion of the light signal $\lambda_2$ by the transducer 11', the corresponding electric signal is produced by the latter, amplified by an amplifier 12' and demodulated by a demodulator 13, whereby original data or information signal is obtained. In this manner, the two-way transmission of three light signals differing in the wavelength can be effected in the system shown in FIG. 4. It is apparent that the two-way transmission for the four or more light signals of different wavelengths can be realized in a similar manner.

Figure 7:
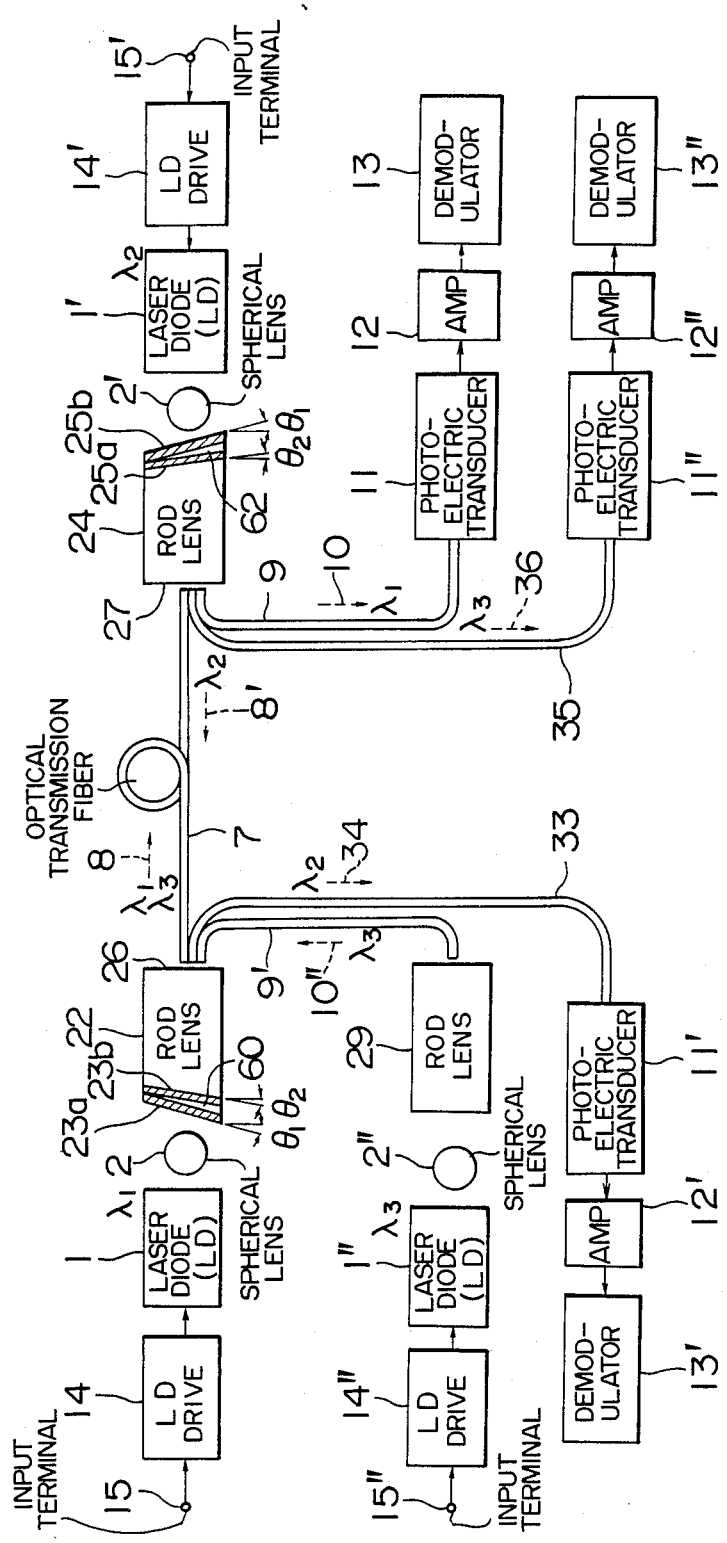
FIG. 7 is a view showing a general arrangement of a two-way optical transmission system according to another embodiment of the invention.

In the case of the two-way transmission system shown in FIG. 7, the optical fiber may be either a single-mode optical fiber or a multi-mode optical fiber. In the case of the single-mode optical fiber transmission, the optical fibers 7, 9 and 9' may be constituted by the single-mode optical fiber, while the multi-mode optical fiber may be employed as the optical fibers 33 and 35 to thereby increase the efficiency of the optical coupling to the photoelectric transducers 11 and 11'. Further, instead of employing the optical fibers 33 and 35, the photoelectric transducer elements 11 and 11' may be bonded to the exit end faces of the rod lenses 29 and 30, respectively, (with or without interposition of a lens). By the way, with the phrase "photoelectric transducer" used herein, it is intended to represent and encompass photoelectric or optoelectric elements such as photodiode (PD), avalanche photodiode (APD) or the like which may be equipped with a preamplifier, if necessary.

Figure 5:
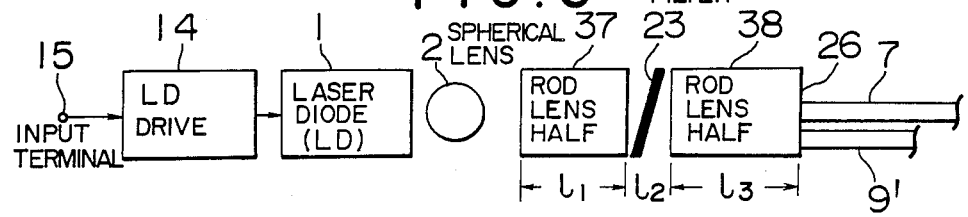
FIG. 5 and FIGS. 6A and 6B are views showing various structure of devices which exhibit optical coupling function and optical multiplexing/demultiplexing function and which are employed for embodying the present invention.

FIG. 5 shows in an enlarged view a structure for introducing light emitted by the semiconductor light emission element to the optical fiber and an arrangement capable of performing the optical demultiplexing function according to the teaching of the present invention. In the arrangement shown in FIG. 5, the rod lens 22 of the system shown in FIG. 3 is divided into a pair of rod lenses 37 and 38, wherein a dielectric thin-film filter 23 is interposed between the rod lenses 37 and 38. In this arrangement, the length $l_1 + l_3$ is substantially equal to ¼ pitch. The length $l_2$ should preferably be smaller than 1/10 pitch. The ends of the optical fibers 7 and 9' are intimately contacted to the end face of the rod lens 38. By adjusting the length $l_2$ and the angle of inclination of the dielectric thin-film filter 23, the degree of the optical coupling to the optical fibers can be adjusted at optimum.

Figure 6A:
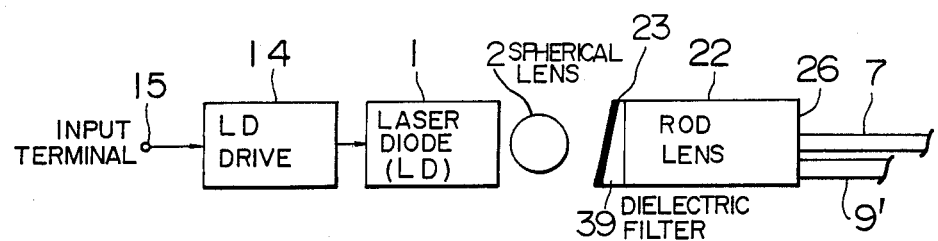
Figure 6B:
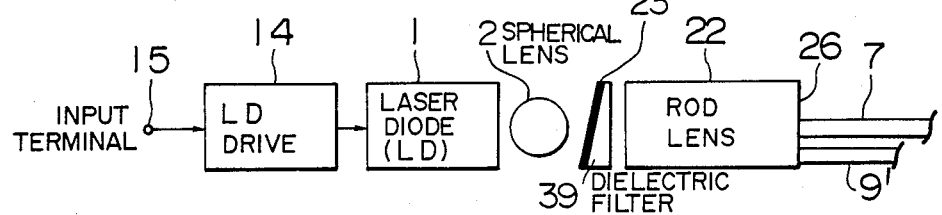

The foregoing description has been made on the assumption that the spherical lenses 2, 2', 2" and 32 are used. However, it should be appreciated that cylindrical lenses may be used in place of these spherical lenses. In other words, any type of lens can be used so far as it can convert the light emitted by the light emission element to the collimated light beam. In the case of the illustrated system described above, the dielectric thin-film (multi-layer thin-film) filter is disposed on the slantingly ground end face of the rod lens. As a version of such disposition, it is also possible that a glass spacer 39 is disposed on one end face of the rod lens 22, wherein the dielectric thin-film filter 23 is formed on the exposed surface of the glass spacer, as is shown in FIG. 6A. Alternatively, a glass spacer 39 deposited with the dielectric thin-film filter may be disposed in front of the associated end face of the rod lens 22 with a small space therebetween, as is illustrated in FIG. 6B. Further, the end faces of the individual devices or elements (such as, for example, optical fiber and rod lens) may be applied with an anti-reflecting coating (AR coating) which is conventionally employed. In that case, the free end of the optical fiber and the end face of the rod lens facing in opposition to the optical fiber end (e.g. the end faces 26 and 27 in FIG. 4) may be ground slantingly or bevelled at a desired angle (in a range of a fraction to tens degrees) and the anti-reflecting coating may be applied thereon. In that case, the near-end crosstalk can be significantly reduced. Further, an isolator may be inserted for isolating the laser diode and the optical fiber.

As the measure for suppressing the reflected wave tending to return to the laser diode or LD from the system coupled thereto, the associated lens may be vertically offset relative to the LD in addition to the slantingly grinding of the end faces of the individual elements. In this conjunction, when the lens is disposed slightly inclined relative to the optical axis, the reflected wave can be suppressed effectively. In the arrangement shown in FIG. 6B, the end face of the lens 22 may be rounded.

In the case of the two-way optical transmission system in which the multi-mode optical fiber is adopted, the spherical lenses 2, 2', 2" and 32 may be spared. More specifically, since the core diameter of the multi-mode optical fiber is several tens $\mu m$ which is five or more times as large as the core diameter of the single-mode optical fiber, it is readily possible to focus the light emitted by the light emission element or LD into the multi-mode optical fiber by adjusting the distance between the rod lens and the optical fiber. Of course, the focusing can be attained with a much improved accuracy by using the spherical lens, which however is inexpensive from the economical standpoint.

Upon packaging the LD and the spherical lens, they are usually hermetically accommodated within a container provided with an optical window through which the light power is outputted. In that case, the dielectric thin-film filter may be applied onto the inner surface of the optical window through vapor deposition or bonding. Then, the characteristics of the dielectric thin-film filter can be effectively protected from deterioration which may otherwise take place due to variations in temperature and humidity.

As will now be seen, by providing the dielectric thin-film filter in combination with the rod lens which serves to introduce the light emitted by the semiconductor light emission element into the optical fiber according to the teaching of the invention, the optical coupling function as well as the optical branching or demultiplexing function can be realized, as the result of which the heretofore required provision of the optical demultiplexer of a complicated structure requiring a large number of components is rendered unnecessary, whereby the two-way optical system of an extremely simple structure and low loss can be obtained.

The present invention can be applied not only to the analogue signal transmission but also to the digital signal transmission.

Figure 8A:
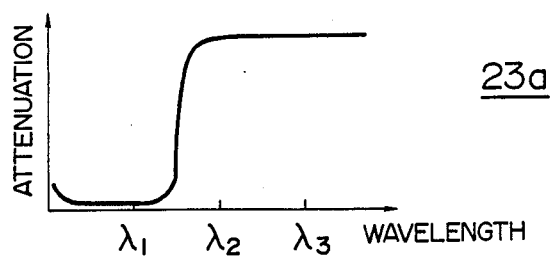
FIGS. 8A to 8D are views for graphically illustrating wavelength vis-á-vis optical attenuation characteristics of dielectric thin-film filters employed in the system shown in FIG. 7.
Figure 8B:
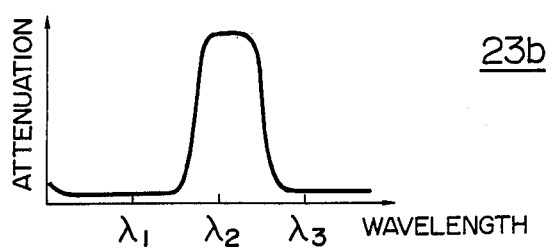
Figure 8C:
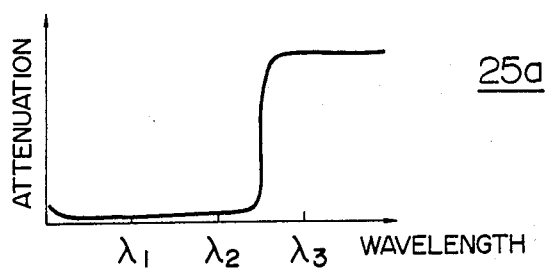
Figure 8D:
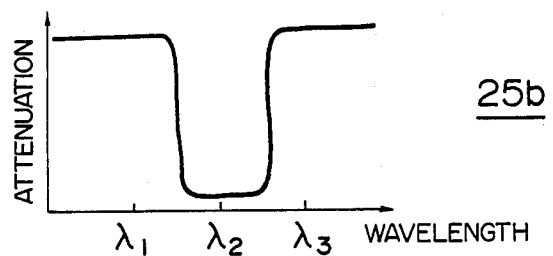

FIG. 7 shows a general arrangement of the two-way optical transmission according to another embodiment of the invention, in which three light signals of different wavelengths are transmitted. The system shown in FIG. 7 differs from the one shown in FIG. 4 in that the end faces of the rod lenses 22 and 24 of about ¼ pitch in length on which the light emitted by the associated LD impinges are each provided with a plurality of dielectric thin-film filters 23a, 23b; 25a, 25b imparted with desired optical characteristics, wherein end portions of three optical fibers are disposed in juxtaposition closely to the opposite or other end faces of the rod lenses, respectively. Referring to FIG. 7, two light signals having the wavelengths $\lambda_1$ and $\lambda_3$, respectively, are transmitted through the optical fiber 7 in the up-link direction indicated by an arrow 8, while the other light signal of wavelength $\lambda_2$ is transmitted through the optical fiber 7 in the down-link direction indicated by an arrow 8'. In other words, the system shown in FIG. 7 is a three-wave two-way transmission system in which two light signals are transmitted in the up-link directon with the other light signal being transmitted in the down-link direction. In conjunction with the illustrated system, FIGS. 8A to 8D graphically show optical characteristics of the individual dielectric thin-film filters 23a, 23b, 25a and 25b, respectively. In these figures, wavelength is taken along the abscissa, while attenuation of light is taken along the ordinate. More specifically, FIG. 8A illstrates the optical characteristics of the dielectric thin-film filter 23a. It will be seen that this filter 23a passes the light signal of wavelength $\lambda_1$ and reflects the light signals of wavelengths $\lambda_2$ and $\lambda_3$. FIG. 8B shows the optical characteristics of the dielectric thin-film filter 23b which passes the light signals of wavelengths $\lambda_1$ and $\lambda_3$ and reflects the light signal of wavelength $\lambda_2$. FIG. 8C shows the optical characteristics of the dielectric thin-film filter 25a which passes the light signals of wavelengths $\lambda_1$ and $\lambda_2$ and reflects the light signal of wavelength $\lambda_3$. Finally, FIG. 8D shows the optical characteristics of the dielectric thin-film filter 25b. As will be seen, this filter 25b characteristically passes the light signal of wavelength $\lambda_2$ and reflects the light signals of wavelengths $\lambda_1$ and $\lambda_3$. The dielectric thin-film filters imparted with the optical characteristics mentioned above can be realized by resorting to hitherto known techniques. Referring to FIG. 7, the laser light (of wavelength $\lambda_1$) emitted by the laser diode or LD 1 is collimated by the spherical lens 2 and transmitted through the dielectric thin-film filter 23a, a glass spacer 60, the dielectric thin-film filter 23b and the rod lens 22 to be focused into the optical fiber 7 and travels therealong in the direction indicated by the arrow 8 to enter the rod lens 24. The light signal of wavelength $\lambda_1$ traveling through the rod lens 24 and impinging on the dielectric thin-film filter 25a passes through it and the glass spacer 62 to impinge on the dielectric thin-film filter 25b. The light signal of wavelength $\lambda_1$ is then reflected by the filter 25b to propagate along the reverse path through the glass spacer 62, the dielectric thin-film filer 25a and the rod lens 24. Since the dielectric thin-film filter 25b is inclined at the angle $\theta_1$, the position on the end face 27 of the rod lens 24 at which the reflected light signal ($\lambda_1$) is focused is deviated from the position of which it enters the rod lens 24 by a distance which is in proportion to the angle $\theta_1$. This deviation $d_1$ can be approximated by the following expression:

$$d_1 = \frac{\theta_1}{n_o \sqrt{A}} \qquad (1)$$

where $n_o$ represents the refractive index of the rod lens 24 and $\sqrt{A}$ represents the refractive index distribution (gradation) constant.

By disposing the optical fiber 9 at the position where the reflected light signal of wavelength $\lambda_1$ is focused, the reflected light signal travels through the core of the optical fiber 9 in the direction indicated by an arrow 10 to be received by a photoelectric transducer 11 whose electrical output signal is amplified by an amplifier 12 and demodulated to the original data signal by a demodulator 13. With the phrase "photoelectric transducer", it is intended to mean an element such as photodiode, avalanche photodiode and the like. The transducer element may be equipped with a preamplifier. On the other hand, the laser light of wavelength $\lambda_3$ emitted by the LD 1'' is collimated by the spherical lens 2'' before entering the rod lens 29. The light signal having traveled through the rod lens 29 is focused into the optical fiber 9' to propagate therethrough in the direction by an arrow 10'' and reach the rod lens 22. The light signal of wavelength $\lambda_3$ incident on the rod lens 22 passes through the dielectric thin-film filter 23b and the glass spacer 60 to reach the dielectric thin-film filter 23a where the light signal ($\lambda_3$) is reflected and travels in the reverse direction through the glass spacer 60 and the dielectric thin-film filter 23b to be focused on the end face 26 of the rod lens 22. The position on the end face 26 at which the reflected light signal is focused is deviated from the position of the port of the optical fiber 9' by a distance $d_1$. The port of the optical fiber 7 is disposed at the position deviated from the optical fiber 9' by $d_1$. To this end, the inclination angle $\theta_1$ of the dielectric thin-film filter 23a is so selected that the light signal of wavelength $\lambda_3$ originating in the LD 1'' is reflected by the filter 23a and focussed into the optical fiber 7. The light signal (wavelength $\lambda_3$) transmitted through the optical fiber 7 in the up-link direction indicated by the arrow 8 reaches the dielectric thin-film filter 25a after having propagated through the rod lens 24, whereby the light signal ($\lambda_3$) is reflected by the filter 25a and propagates through the rod lens 24 in the reverse direction to be focused and coupled to the optical fiber 35 whose entrance end is disposed on the end face 27 of the lens 24 at the position at which the reflected signal light ($\lambda_3$) is focused. When the distance between the optical fibers 7 and 35 on the end face 27 of the rod lens 24 is represented by $d_2$, the following relation applies valid:

$$d_2 = \frac{\theta_2}{n_o \sqrt{A}} \qquad (2)$$

The light signal of wavelength $\lambda_3$ transmitted through the optical fiber 35 in the direction indicated by an arrow 36 is received by a photoelectric transducer element 11″ to be amplified by an amplifier 12″ and demodulated to the information signal through a demodulator 13″.

The laser light of wavelength $\lambda_2$ emitted by the LD 1′ is collimated by a spherical lens 2′ and transmitted through the dielectric thin-film 25b, a glass spacer 62 and the dielectric thin-film filter 25a to enter the rod lens 24. The light signal having traveled through the rod lens 24 is focused onto the optical fiber 7 to be transmitted therethrough in the direction indicated by an arrow 8′ and enter the rod lens 22. The light signal of wavelength $\lambda_2$ having propagated through the rod lens 22 is reflected by the dielectric thin-film filter 23b to travel through the rod lens 22 in the reverse direction, being focused onto the optical fiber 33. The light signal of wavelength $\lambda_2$ transmitted through the optical fiber 33 in the direction indicated by an arrow 34 is received by a photoelectric transducer element 11′ and amplified by an amplifier 12′ whose output signal is demodulated by a demodulator 13′ to the data or information signal.

It will be appreciated that the two-way optical transmission of four or more light signals of different wavelengths can be readily realized in a simplified structure in the similar manner. According to the teaching of the invention embodied in the system illustrated in FIG. 7, a single rod lens is imparted with the function for coupling the laser light signal to the optical fiber and the optical demultiplexing (or multiplexing/demultiplexing) function. Accordingly, the number of the component devices or elements can be decreased (down to 1/5 or less when compared with the prior art system), as the result of which the insertion loss as well as margin loss due to error involved in the optical axis positioning can be significantly reduced. Taking numerical examples, loss in the hitherto known optical multiplexer/demultiplexer for three wavelength signals is about 5 dB per piece. Since a pair of optical multiplexers/demultiplexers have to be installed at both ends of the optical fiber, respectively, the total loss in the optical multiplexers/demultiplexers amount to as great as about 10 dB. In contrast, it has been found that in the case of the two-way transmitting system designed for three light signals, the total loss in the dielectric thin-film filters is about 1.5 dB while the loss due to the optical axis positioning error is about 1.2 dB, the sum of losses being about 2.7 dB. Accordingly, the inventive system can be improved by 7.3 dB in respect to the loss over the prior art system. By using the laser light of the long wavelength band (longer than 1 μm), the length of the optical fiber can be increased more than 10 km over the length of the optical transmission fiber used in the hitherto known two-way optical transmission system. Additionally, it has been established that the laser light coupling efficiency to the optical fiber remains substantially the same as that of the hitherto known system. Since the two-way transmission system according to the present invention can be implemented in an integral two-way transmission LD module in which the LD, the spherical lens, the rod lens attached with the dielectric thin-film filter and the pig-tail optical fiber are integrally combined, the inventive optical transmission system can be realized in a miniature size and enjoy very high reliability. Further, the manufacturing cost can be reduced to less than ½ of the cost required in the hitherto known system. Thus, the invention opens a way to practical application of the optical communication system in the near future.

The angles $\theta_1$ and $\theta_2$ may be selected from a range of a fraction to thirties degrees. By increasing the angle $\theta$, the distance among the optical fiber port portions juxtaposed to one another on the end face (26, 27) of the rod lens can be correspondingly enlarged. Although the system shown in FIG. 7 is of a substantially symmetric circuit configuration, the invention is not restricted to such arrangement. In the case of the single-mode optical fiber transmission system in which the single-mode optical fiber is used as the optical fiber 7, the optical fiber 9′ is also constituted by the single-mode optical fiber. When the lengths of the optical fibers 9, 33 and 35 are sufficiently short, the multi-mode optical fiber having a large core diameter and significant difference in the refractive index can be employed as these optical fibers. Further, the photoelectric transducer element may be attached to the associated end face (26, 27) of the rod lens (with or without interposition of a lens). In that case, the optical fibers 9, 33 and 35 may be eliminated. The invention can be equally applied to the two-way transmission system in which the optical fiber 7 is constituted by a multi-mode optical fiber. In that case, the spherical lens interposed between the LD and the rod lens may be spared. In the system shown in FIG. 7, the distance between the end face of the LD and the spherical lens is selected equal to the focal length of the spherical lens, while the distance between the spherical lens and the rod lens is selectd equal to the sum of the focal lengths of these lenses. The focal lengths of the spherical lens and the rod lens are selected in dependence on the spot size of the optical fiber and the diameter of light beam emitted by the laser diode or LD.

Figure 9:
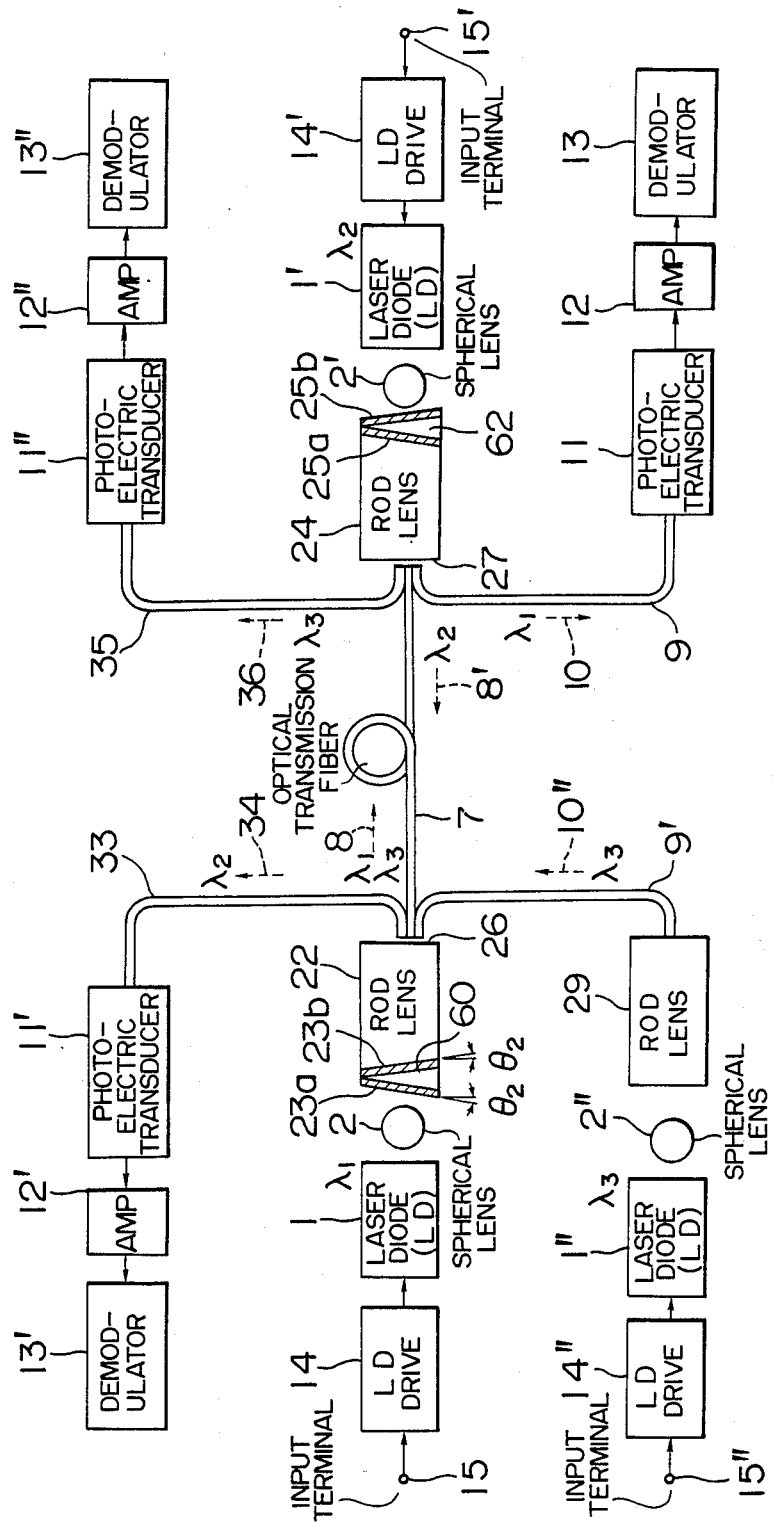
FIG. 9 is a view similar to FIG. 7 and shows a two-way optical transmission system according to a further embodiment of the invention.
Figure 10A:
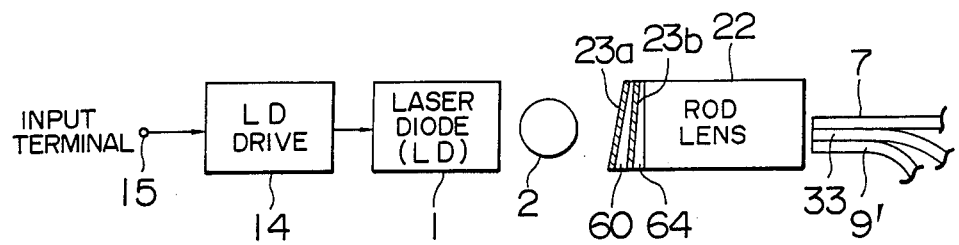
FIGS. 10A to 10D and 11A to 11C are views showing various structures of the devices which are imparted with the optical coupling function and the optical multiplexing/demultiplexing function according to the teachings of the invention.
Figure 10B:
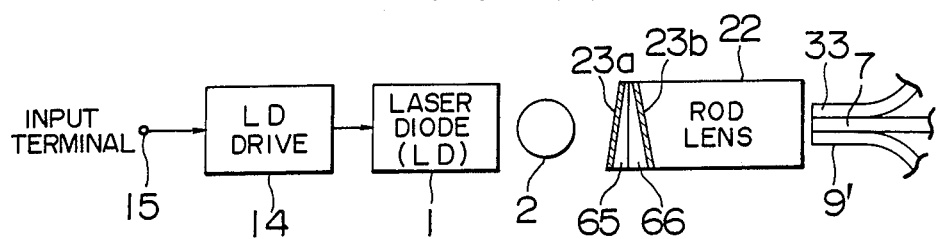
Figure 10C:
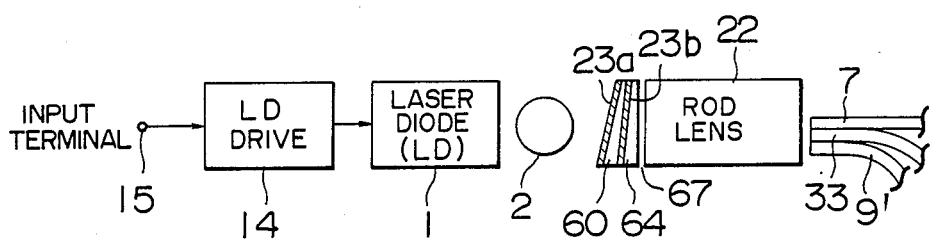
Figure 10D:
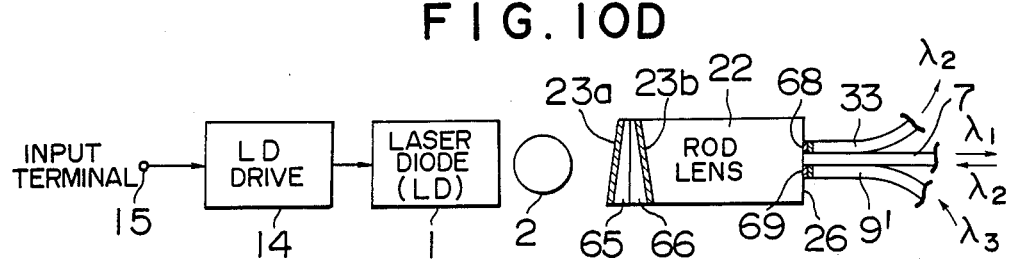

FIG. 9 shows a two-way optical transmission system according to still another embodiment of the invention. In this optical transmission system, the optical fiber 7 is disposed on and along the center axes of the rod lenses 22 and 24, wherein other optical fibers 9′ and 33 (or 9 and 35) are disposed, respectively, above and below the optical fiber 7 in juxtaposition to one another. In this conjunction, both surfaces of the glass spacer 60 (or 62) are formed with the dielectric thin-film filters 23a and 23b (or 25a and 25b), respectively, at a same angle $\theta_2$ of inclination. Operation of this optical transmission system is the same as that of the system shown in FIG. 7. Accordingly, any further description will be unnecessary.

FIGS. 10A to 10D are views for illustrating on an enlarged scale the structure exhibiting the coupling function for introducing the light emitted by the LD shown in FIG. 7 to the optical fiber and the optical multiplexing or demultiplexing function. In the case of the structure shown in FIG. 10A, one end face of the rod lens 22 is attached with a stack including a glass spacer 64, a dielectric thin-film filter 23b, a glass spacer 60 and a dielectric thin-film filter 23a in this order as viewed from the side of the rod lens. For positioning the dielectric thin-film filters 23a and 23b at a desired angle relative to the incidence plane of laser light, both end faces of each of the glass spacers 60 and 64 are ground at a corresponding angle of inclination. In the case of the structure shown in FIG. 10B, glass spacers 65 and 66 are joined together, wherein the dielectric thin-film filters 23a and 23b are attached to the exposed surfaces of the spacers 65 and 66, respectively. The laminated assembly thus realized is then bonded to the one end face of the rod lens 22. The glass spacers 65 and 66 are of symmetrical configuration. The one end face of the rod lens 22 is ground obliquely or bevelled. In the structure shown in FIG. 10C, there is provided a space 67 between the glass spacer/dielectric filter assembly (23a, 23b, 60, 64) and the rod lens 22 for the purpose of allowing the fine adjustment of the condition for focusing the laser light onto the optical fiber. In the case of the structure shown in FIG. 10D, additional dielectric thin-film filters 68 and 69 are provided on the end face 26 of the rod lens 22 in abutting relation to the ends of the optical fibers 9' and 33, respectively, to thereby assure more positive isolation between the different wavelengths. More specifically, the filter 68 is constituted by a band pass filter which passes only the light signal of wavelength $\lambda_2$, while the filter 69 is constituted by a band pass filter capable of passing only the light of wavelength $\lambda_3$. With this structure, the incidence of the unwanted wavelengths to the associated optical fibers can be effectively suppressed.

It should be mentioned that the invention is not restricted to the system arrangements described above. For example, the spherical lenses 2, 2' and 2'' may be replaced by cylindrical lenses without departing from the concept of the invention. Further, the number of wavelengths as multiplexed is not limited to three. For example, one end face of each rod lens may be attached with three or more dielectric thin-film filters at different angles of inclination, wherein four or more optical fibers may be disposed on the side of the other end face of the rod lens. Alternatively, in the optical transmission system shown in FIG. 7 or 9, the end face of the rod lens 29 on which the laser light impinges may be attached with a dielectric thin-film filter in the manner similar to the rod lens 22, whereby one more optical fiber can be provided adjacent to the other end face of the rod lens (refer to FIG. 4). In that case, a rod lens attached with a dielectric thin-film filter may be disposed in front of the photoelectric transducer 11 of the receiver station.

For packaging the LD and the spherical lens, they are conventionally housed in a container or receptacle having an optical or light window in an airtight manner, wherein the laser light is taken out through the window. In carrying out the invention, the similar packaging technique can be adopted.

It should be mentioned that a light emission diode (LED) may be used as the semiconductor light emission element in place of the laser diode (LD). Since the LED has a broader spectral distribution than the LD, it is desirable to use the dielectric thin-film filter having steeper damping or attenuating characteristic and increase the wavelength spacing. In this manner, the two-way optical transmission which has been heretofore realized by using two optical transmission fibers can be realized by using only one optical transmission fiber, promising the cost reduction.

The length of the rod lens may be slightly shorter or longer than n/4 pitch (where n is 1, 3, 5 ...) in view of the addition of the dielectric thin-film filters and the glass spacers.

Figure 11A:
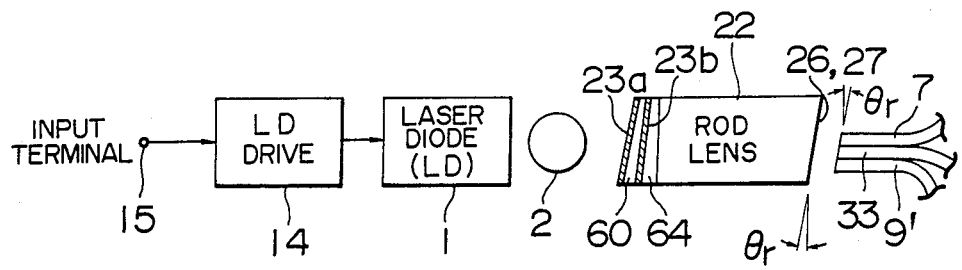
Figure 11B:
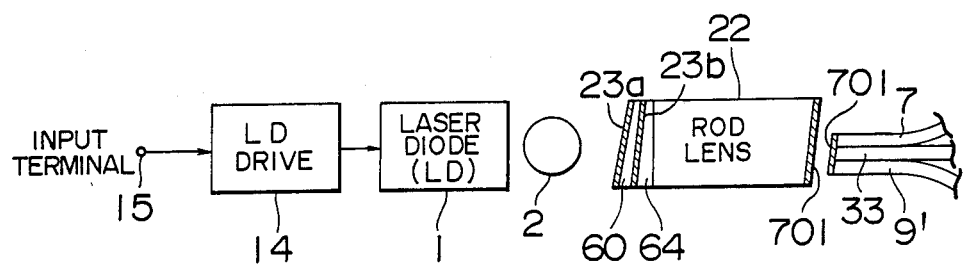
Figure 11C:
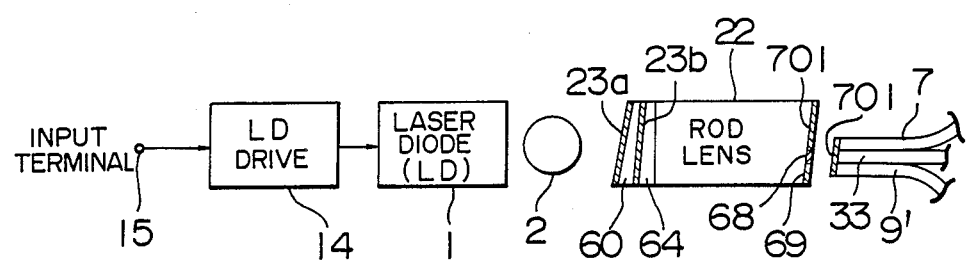

It goes without saying that the two-way optical transmission system can be adopted not only for digital transmission but also for analogue transmission. Further, in the systems shown in FIGS. 7 and 9, the end faces 26 and 27 of the rod lenses 22 and 24 may be cut or ground slant at an angle $\theta_r$ (not shown) in a range of a fraction to tens degrees as shown in FIG. 11A and/or applied with an anti-reflection coating (AR coating) 701 as illustrated in FIG. 11B, with a view to suppressing possible leakage or crosstalk and interference of undesired optical signals to the desired optical signal at the individual receivers. In that case, when the angle $\theta_r$ is selected, for example, at 8 degrees, attenuation due to the reflection at the end face of the rod lens in concern amounts to about 35 dB. Further, the attenuated optical signal is again attenuated more than 10 dB due to reflection by the dielectric thin-film filter and enters the optical fiber, being accompanied with the desired coupling loss, whereby near-end crosstalk attenuation of more than 50 dB can be attained. Additionally, the ends of the optical fibers disposed at the exit end of the rod lens in concern may be ground slant at the desired angle mentioned above, as is shown in FIGS. 11A to 11C, to thereby increase the crosstalk attenuation, which may be further increased by combining the anti-reflection coating 701 with the dielectric thin-film filters 68 and 69. In other words, the dielectric thin-film filters 68 and 69 are disposed on the exit end face of the rod lens 22 in opposition to the ends of the optical fibers 9' and 33 for preventing a part of light emitted by the LD 1 from entering the optical fibers 9' and 33 due to reflection at the exit end face of the rod lens 22. Needless to say, the characteristics of these dielectric thin-film filters 68 and 69 are so designed as to attenuate the light produced by the laser diode or LD 1.

It is noted that the provision of these dielectric thin-film filters 68 and 69 are effective to suppress the crosstalk due to the spontaneous light emission of the LD (or LED). In particular, this feature is impotant for the optical analogue transmission.

The dielectric thin-film filters are not restricted to the optical characteristics described above in conjunction with the illustrated embodiments. The band pass filter, short-wave band pass filter and long-wave band pass filters can be employed in various combinations.

As will be appreciated, by forming the dielectric thin-film filter on the rod lens for introducing light emitted by the semiconductor light emission element to the optical fiber according to the teaching of the invention, the optical coupling function and the optical multiplexing/demultiplexing function can be realized without requiring the provision of the hitherto known optical multiplexer of a complicated structure constituted by a large number of components. In this way, the two-way optical transmission system characterized by low loss and extremely simplified structure can be realized, which is suited for a long distance transmission.

Figure 12:
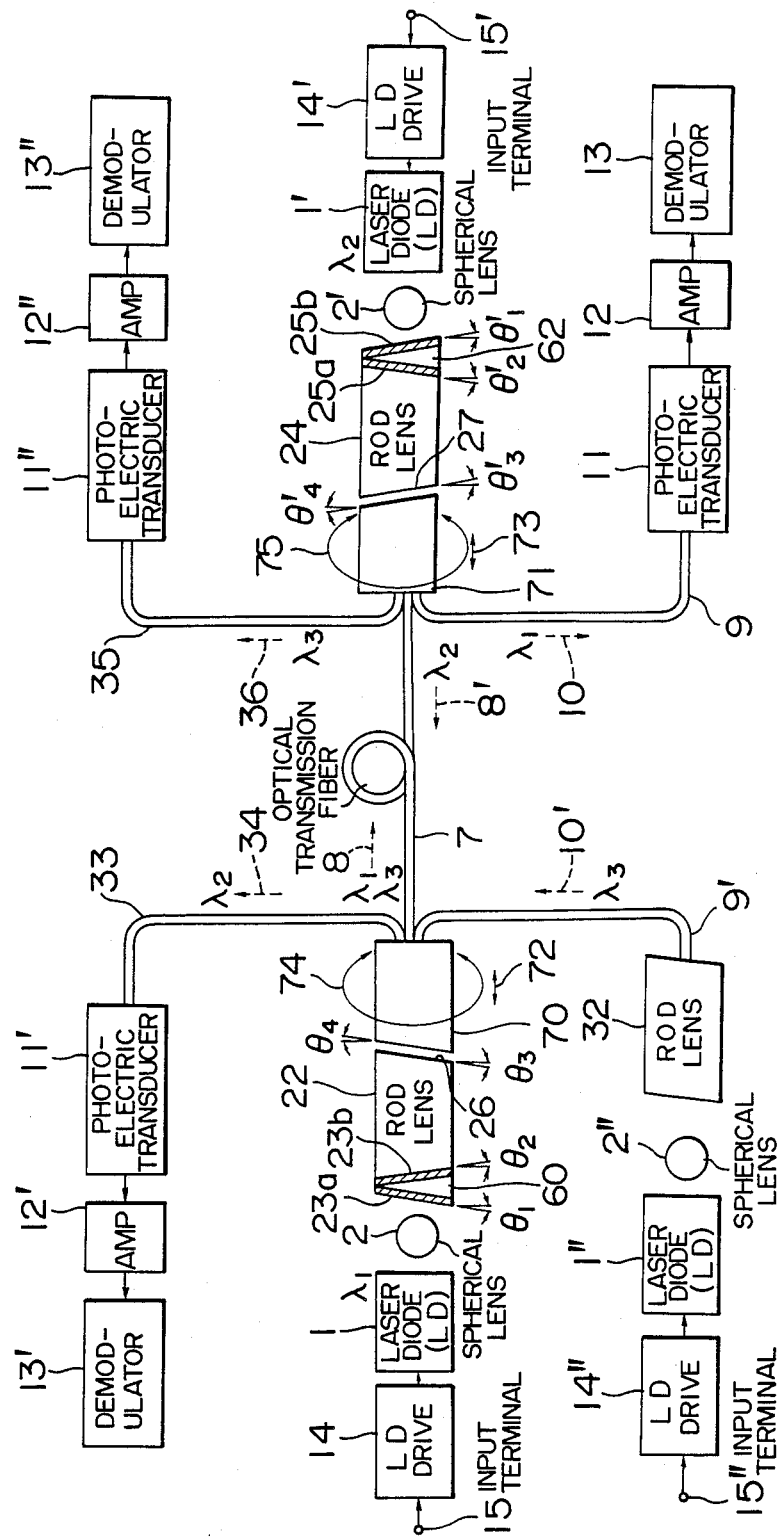
FIG. 12 is a block diagram showing a general arrangement of a two-way optical transmission system according to another embodiment of the invention.

FIG. 12 is a block diagram showing a general arrangement of a two-way optical transmission system according to a further embodiment of the present invention. The system shown in FIG. 12 differs from the one shown in FIG. 9 in that optical fiber holding means or holders 70 and 71 are provided at locations adjacent to the light exit end faces of the rod lenses 22 and 24, respectively. The structure of the optical fiber holders 70, 71 will be described in detail hereinafter.

In operation, upon application of an information or data signal to the input terminal 15, the LD drive circuit 14 operates to drive the LD 1. The laser light of wavelength $\lambda_1$ emitted by the LD 1 is collimated by the spherical lens 2 and passes through the dielectric thin-film filter 23a, the glass spacer 60, the dielectric thin-film filter 23b and the rod lens 22 to enter the optical fiber holder 70. In this conjunction, when the rod lens 22 and the optical fiber holder 70 are so positioned that the center axes of them practically coincide with each other with the optical fiber 7 being disposed on the center axis, the adjustment for maximizing the light signal entering the optical fiber can be effected merely by moving the optical fiber holder 70 in the axial direction as indicated by an arrow 72.

Through the adjustment mentioned above, the laser light of wavelength $\lambda_1$ is focused into the optical transmission fiber 7 held within the optical fiber holder 70 to be transmitted through the optical fiber 7 in the direction indicated by the arrow 8 and enter the rod lens 24 thorugh the optical fiber holder 71. The optical fiber 7 is disposed substantially on the center axis of the axially aligned optical fiber holder 71 and rod lens 24, wherein the adjustment of the optical couplng between the optical fiber holder 71 and the rod lens 24 can be accomplished simply by moving the optical fiber holder 71 in the direction indicated by an arrow 73. The light signal of wavelength $\lambda_1$ having traveled through the rod lens 24 impinges on the dielectric thin-film filter 25b through the dielectric thin-film filter 25a and a glass spacer 62. The light signal of wavelength $\lambda_1$ is reflected by the dielectric thin-film filter 25b and caused to travel through the glass spacer 62, the dielectric thin-film filter 25a and the rod lens 24 in the reverse direction. Since the dielectric thin film 25b is formed on the end face of the rod lens slanted at an angle $\theta_1'$, the position on the end face 27 of the rod lens 24 at which the reflected light is focused is deviated from the entrance or incidence position by a distance proportional to the angle $\theta_1'$. The position of the optical fiber 9 in the optical fiber holder 71 is previously so determined that the fiber 9 can be disposed at the position where the reflected light signal is focused. Then, the adjustment of the optical coupling can be readily accomplished simply by rotating the optical fiber holder 71 in the circumferential direction, as indicated by an arrow 75. The reflected light signal of wavelength $\lambda_1$ then travels through the core of the optical fiber 9 in the direction indicated by an arrow 10 to be received by the photoelectric transducer 11 and converted into an electric signal which is demodulated to the original information signal by the demodulator 13 after having been amplified by the amplifier 12.

Upon application of an information signal to the other input terminal 15" of the up-link circuit, the LD drive circuit 14" drives the LD 1" which oscillates at a wavelength $\lambda_3$ to emit the laser light of the wavelength $\lambda_3$ which is then collimated by the spherical lens 2" to enter the rod lens 32. The light signal propagated through the rod lens 32 is focused into the optical fiber 9' to travel therethrough in the direction indicated by an arrow 10' and enter the rod lens 22 by way of the optical fiber holder 70. The light signal of wavelength $\lambda_3$ entering the rod lens 22 reaches the dielectric thin-film filter 23a after having passed through the dielectric thin-film filter 23b and the glass spacer 60. The light signal of wavelength $\lambda_3$ is reflected by the filter 23a to travel in the reverse direction through the glass spacer 60, the dielectric thin-film filter 23b and the rod lens 22 to be focused into the core of the optical transmission fiber 7 mounted in the optical fiber holder 70 to be transmitted through the fiber 7 in the direction indicated by the arrow 8. The angle $\theta_1$ is previously so selected that the light signal of wavelength $\lambda_3$ is reflected by the dielectric thin-film filter 23a to be thereby focused into the optical transmission fiber 7 mounted in the optical fiber holder 70. The light signal of wavelength $\lambda_3$ transmitted through the optical fiber 7 in the direction indicated by the arrow 8 enters the rod lens 24 by way of the optical fiber holder 71 to reach the dielectric thin-film filter 25a. The light signal of wavelength $\lambda_3$ is reflected by this dielectric thin-film filter 25a to be transmitted through the rod lens 24 in the reverse direction and focused into the core of the optical fiber 35 held by the optical fiber holder 71.

The angle $\theta_2'$ is previously set at such a value that the light signal of wavelength $\lambda_3$ reflected at the dielectric thin-film filter 25a can be focused to the optical fiber 35 mounted in the optical fiber holder 71. The light signal transmitted through the optical fiber 35 in the direction indicated by an arrow 36 is received by the photoelectric transducer element 11" whose electrical output signal is amplified by the amplifier 12" and subsequently demodulated to the original information signal by the demodulator 13".

Upon application of an information signal to the input terminal 15' of the down-link circuit, the LD drive circuit 14' drives the LD 1' which then emits a laser light signal of wavelength $\lambda_2$. This light signal is collimated by the spherical lens 2' and enters the rod lens 24 after having transmitted through the dielectric thin-film filter 25b, the glass spacer 62 and the dielectric thin-film filter 25a. The light signal of wavelength $\lambda_2$ having traveled through the rod lens 24 is focused to the optical transmission fiber 7 mounted in the optical fiber holder 71 to be transmitted through the fiber 7 in the direction indicated by the arrow 8' and enter the rod lens 22 by way of the optical fiber holder 70. The light signal of wavelength $\lambda_2$ having traveled through the rod lens is reflected by the dielectric thin-film filter 23b and caused to travel through the rod lens 22 in the reverse direction, to be thereby focused into the optical fiber 33. The light signal of wavelength $\lambda_2$ transmitted through the optical fiber 33 in the direction indicated by the arrow 34 is received by the photoelectric transducer element 11' to be converted into a corresponding electric signal which is then amplified by the amplifier 12' and demodulated to the original information signal by the demodulator 13'. It should be noted that the reflecting end faces 26 and 27 of the rod lenses 22 and 24 as well as both end faces of the rod lens 32 are ground slant for the purpose of protecting the LD and/or the photoelectric transducer from the influence of the reflected light signals. Each of these end faces may be additionally applied with an anti-reflection coating (AR coating).

As will be apparent from the foregoing description, in the case of the two-way optical transmission system shown in FIG. 12, there are disposed on the entrance end face of the rod lens 22 which serves to couple the laser light emitted by the LD 1 to the optical transmission fiber 7 one or more dielectric thin-film filters 23a and 23b which have predetermined optical characteristics, respectively, while disposed on the side of the exit end face of the rod lens 22 is the optical fiber holder 70 which serves for positioning and holding fixedly in an integral manner the optical transmission fiber 7 substantially on the center axis of the rod lens 32, the branching optical fiber 33 for transmitting the light signal separated by the dielectric thin-film filters 23a and 23b located on the side of the optical transmission fiber 7 and additionally the multiplexing optical fiber 9' which serves to introduce the light emitted by the other LD 1" of different oscillation wavelength to the dielectric thin-film filters 23a and 23b for multiplexed transmission. The rod lens 22 and the optical fiber holder 70 disposed fixedly and integrally constitute an optical module for the two-way optical transmission.

Next, description will be made on the structure of the optical fiber holders 70 and 71.

FIGS. 13A and 13B are views showing a structure of the optical fiber holder 70 (or 71) which can be employed in the transmission system shown in FIG. 12, wherein FIG. 13A is a front view and FIG. 13B is an axial sectional view.

Referring to the figures, the optical fiber holder 70 (or 71) has a cylindrical structure provided with through-holes 43, 44 and 45 in which the optical fibers are inserted, respectively. As will be appreciated from the description in conjunction with FIG. 12, the through-hole or bore 43 is destined to receive the optical transmission fiber 7, the hole 44 is destined to mount therein the optical fiber 9' (or 9), and the hole 45 is destined to mount the optical fiber 33 (or 35). The distance between the through-holes 43 and 44 and the distance between the through-holes 43 and 45 are determined in dependence on the angles $\theta_1$ (or $\theta_1'$) and $\theta_2$ (or $\theta_2'$) of the dielectric thin-film filters 23a and 23b (or 25a and 25b) provided on the slanted end face of the rod lens 22 (or 24), respectively, and are in proportion to these angles. On the other hand, the distance in concern is in reverse proportion to the product of the refractive index and the index gradation constant of the rod lens 22 (24). As will be seen in FIG. 13A, the through-hole 43 is formed on the center axis of the cylindrical holder 70 (71) (which passes through the intersection of the X—X' axis and the Y—Y' axis). As will be seen in FIG. 13B, the holder 70 (71) has an end face opposite to the rod lens 22 (24) which is bevelled at an angle $\theta_4$, while the other end of the optical fiber holder is formed with a cylindrical recess of a large diameter for accommodating a number of the optical fibers therein.

FIGS. 14A and 14B are views similar to FIGS. 13A and 13B and show the optical fiber holder 70 (71) in the state in which the optical fibers are mounted.

The one end face 46 of the optical fiber holder 70 (71) (which is in opposition to the rod lens) inclusive of the end faces of the optical fibers is ground or bevelled at an angle $\theta_4$. This is for the purpose of preventing the light signal from being reflected at the ends of the optical fibers to enter again the LD, the phototelectric transducer or the optical fibers. The angle $\theta_4$ should preferably be set in a range of a fraction to 10 degrees. Usually, the angle $\theta_4$ is slected equal to about 8 degrees. This end face 46 may be applied with an anti-reflection coating (AR coating). For effecting the optical adjustment, the optical fiber holder 70 (71) may be simply rotated in either one of the directions indicated by arrows 74 or 74'. Among the three optical fibers 7, 9' and 33 fixedly inserted and mounted in the optical fiber holder, the optical transmission fiber 7 is constituted by a single-mode optical fiber, while the other two fibers 9' and 33 are constituted by multi-mode optical fibers, respectively.

FIG. 15A and FIG. 15B show in a front view and a longitudinal sectional view of another structure of the optical fiber holder which may be used in the optical transmission system shown in FIG. 12. This holder is designed to mount fixedly two optical fibers 7 and 33 in V-like grooves 77 and 78, respectively. As will be seen in FIG. 15A, the optical fiber holder is composed of a pair of semicylindrical members 47 and 48 formed with the V-like grooves 77 and 78, respectively. After the optical fibers 7 and 33 have been fixedly disposed in the respective V-like grooves, the semicylindrical members 47 and 48 are joined together to constitute the optical fiber holder 70 of the cylindrical configuration. In this case, the optical fiber 7 is required to be disposed along the longitudinal axis (i.e. the axis extending perpendicularly to the X—X' axis and the Y—Y' axis at the intersection). Accordingly, the semicylindrical members 47 and 48 are not divided along the plane containing the center axis but divided along the plane containing the top of the V-like groove 77 formed in the semicylindrical member 47.

FIGS. 16A and 16B show a version of the optical fiber holder shown in FIGS. 15A and 15B, which is designed to hold three optical fibers in the V-like grooves.

In this case, the optical transmission fiber 7 is stationarily fixed at the center coinciding with the intersection between the X—X' axis and the Y—Y' axis. It should be noted that optical fibers having large core diameter and outer diameter are used as the optical fibers 9' and 33 with an attempt to increase the light signals supplied to the associated photoelectric transducers and compensate for the misalignment of the optical axes.

The distance between the optical fibers 7 and 9' and the distance between the optical fibers 7 and 33 are determined in dependence on the angles $\theta_1$ and $\theta_2$ at which the dielectric thin-film filters 23a and 23b are disposed (refer to FIG. 12). Deviations of the distance between the optical fibers 7 and 9' and between the optical fibers 7 and 33 due to manufacturing errors involved in the angles $\theta_1$ and $\theta_2$ can be sufficiently compensated for by using the optical fibers 9' and 33 of an increased core diameter. Accordingly, the optical coupling can be readily adjusted merely by rotating the optical fiber holder 70 in the circumferential direction 74 or 74', as shown in FIG. 14B. The structure shown in FIGS. 16A and 16B differs from the one shown in FIGS. 15A and 15B in that the cylindrical optical fiber holder is constituted by two semicylindrical halves 49 and 50 divided along the vertical center plane Y—Y', each of the cylindrical halves being formed with three V-like grooves. It will be seen that the lateral V-like grooves are formed in larger size than the center V-like groove. This is because the optical fibers 9' and 33 of larger core diameter and outer diameter are disposed above and below the central optical fiber 7 as viewed in the vertical direction. It should be mentioned that in the case of the holder structures illustrated in FIGS. 14A, 14B, 15A and 15B, positional deviations due to the manufacturing error can be compensated for by using the optical fibers having a large core diameter and outer diameter.

Figure 17:
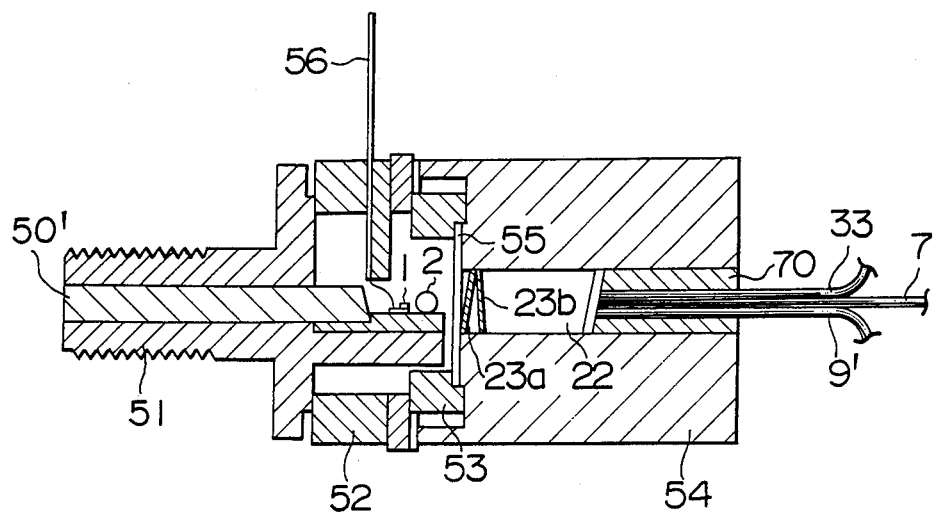
FIG. 17 is a vertical sectional view showing a structure of an integral optical module according to another embodiment of the invention.

FIG. 17 is a longitudinal sectional view showing an integrated module structure which comprises a laser diode or LD, a glass rod for extracting a light signal for the monitoring purpose, a spherical lens, a rod lens attached with dielectric thin-film filters and an optical fiber holder. Referring to FIG. 17, a reference numeral 50' denotes the monitor light extracting glass rod, and 51, 52 and 54 denote parts for packaging, 55 denotes an optical window, and 56 denotes an electrode. The laser diode or LD 1 is mounted at a position adjacent to the electrode 56 with the spherical lens 2 being mounted adjacent to the LD 1. The end face of the rod lens 22 located on the side of the spherical lens 2 is attached with the dielectric thin-film filters 23a and 23b, wherein the optical window 55 is interposed between the filters (23a, 23b) and the spherical lens 2. Disposed on the side of the other end face of the rod lens 22 is the optical fiber holder 70 with a small gap relative to the lens 22, wherein three optical fibers 7, 9' and 33 are inserted stationarily in the holder 70.

As will be seen in FIG. 17, when the optical fiber holder 70 (71) of a cylindrical configuration is used, the LD 1, the monitor light extracting glass rod 50', the spherical lens 2, the rod lens 22 equipped with the dielectric thin-film filters and the optical fiber holder 70 can be assembled in an integral structure, whereby the optical module for the two-way transmission can be realized. A photoelectric transducer element for the monitoring may be disposed immediately downstream of the LD (on the side opposite to the spherical lens) or alternatively downstream of the glass rod 50'. With this arrangement, significantly high reliability, miniaturization, inexpensiveness and loss reduction can be accomplished, as compared with the hitherto known optical transmission system in which the optical multiplexer is discretely employed.

It should be mentioned that light emission diode of end-face emission type or planer emission type may be used as the laser oscillator in place of the laser diode. In case the light emission diode is employed, it is preferred that an optical focusing system including a lens, a parabolic element or the like may be disposed at the emission side of the light emission diode or LED to thereby collimate the light emitted by the LED before it enters the rod lens equipped with the dielectric thin-film filters. Since the LED has a broader spectral distribution than the LD, it is desirable to use the dielectric thin-film filters imparted with steeper attenuation characteristics and having greater wavelength spacing. Further, the entrance end of the optical fiber 7 may be configured in a spherical form or alternatively attached with a spherical lens.

With the structure of the optical fiber holder in which the optical transmission fiber is fixedly disposed substantially on the longitudinal center axis of the holder while the demultiplexing optical fiber and the multiplexing optical fiber are fixedly juxtaposed to the optical transmission fiber with a predetermined distance therebetween, the adjustment of optical coupling to the optical transmission fiber can be effected simply by rotating the optical fiber holder. Since the adjustment of optical coupling to the optical transmission fiber can be carried out independent of the adjustment of the optical coupling to the demultiplexing optical fiber and the multiplexing optical fiber, the optical adjustment is facilitated, whereby skillfulness is no more required. Further, the optical fiber holder of the cylindrical of circular column-like configuration is insensitive to variations in temperature. By virtue of the arrangement such that the optical fibers are integrally secured to the optical fiber holder of cylindrical or column-like configuration, the united structure exhibits significant resistance or enhanced withstanding capability to vibration or shock, assuring that the distance or spacing among the individual optical fibers is not susceptible to variations. In view of the fact that the inter-fiber distance is on the order of several hundred microns, the separate mounting of the individual optical fibers is disadvantageous, because the positions of the optical fibers will be likely to undergo variations under vibration. Besides, the mounting or fixing of the individual fibers separately is very troublesome and difficult to be realized. Further, by securing fixedly the rod lens and the cylindrical or column-like optical fiber holder by using a separately prepared cylindrical container in the form of an integral unit, the stability of the integral unit against the temperature changes and vibration can be much enhanced.

Further, since the two-way optical transmission system is imparted with the two functions, i.e. the optical coupling function and the optical multiplexing and demultiplexing functions, by using the rod lenses each provided with the dielectric thin-film filter for introducing light signals emitted by the semiconductor light emission element (LD, LED and the like), the two-way transmission system according to the invention can be implemented in a much simplified structure, whereby the insertion loss as well as manufacturing cost can be significantly reduced as compared with the hitherto known system. In this connection, it should be recalled that the insertion loss of the optical multiplexer/demultiplexer is about 5 dB per piece in the case of the prior art transmission system. In contrast, in the illustrated systems embodied according to the invention, the loss in concern is reduced to one-third or less, whereby the transmission distance can be correspondingly increased. The invention can be applied effectively particularly to the optical two-way transmission system in which the optical transmission line is constituted by a single-mode optical fiber.

The dielectric thin-film filters having optical characteristics (transmission and reflection characteristics) which differ from one to another filters may be formed on the LD-light entrance end face of the rod lens in n layers at mutually different angles $\theta_n$ (n=1, 2, 3 ...). By bevelling the other end face of the rod lens and disposing the optical transmission fiber substantially on the center axis of the rod lens with n demultiplexing and multiplexing optical fibers being disposed around the optical transmission fiber, all the fibers being secured by the optical fiber holder, it is possible to realize the optical transmission of n wavelengths by using a pair of the optical modules. The end face portions of the rod lens which are located in opposition to the demultiplexing optical fiber and the multiplexing optical fiber may be formed with the dielectric thin-film filters, respectively, for suppressing the near-end crosstalk and allowing only the light of desired wavelength to pass therethrough.

It should be added that the optical fiber holder is not restricted to the cyclindrical or circular column-like configuration. A prism-like configuration or other may be adopted on the condition that the optical transmission fiber (the fiber 7 in the illustrated system) can be positioned substantially along the center axis.

As will be appreciated from the foregoing, by virtue of the much simplified structure of the two-way optical transmission module which also allows the facilitated adjustment of the optical coupling, the time taken for the adjustment of the optical coupling can be significantly reduced, while the high-precision coupling adjustment as well as the cost and loss reduction can be assured. Thus, the system according to the invention promises practical realization of the long-distance optical transmission system. It is further to be noted that the two-way optical transmission module according to the invention exhibits high stability and reliability even under adverse environmental conditions.

FIG. 18A to FIG. 24B show other embodiments of the two-way optical transmission module according to the invention.

FIGS. 18A to 18D illustrate stepwise a process of manufacturing a rod lens assembly, according to which a rod lens is inserted and secured in a cylindrical tube having a reference mark, being followed by a step of grinding slant the end faces of the assembled rod lens, which faces are then formed with dielectric thin-film filters. In FIGS. 18A to 18D, front views are shown at (A), right side views are shown at (B) and left side views are shown at (C). At a step shown in FIG. 18A, the outer periphery of a rod lens 80 is coated with a thin film 81 (metal film or bonding agent film). At a step shown in FIG. 18B, the rod is inserted and secured in a cylindrical tube 82 having a protrusion 83 serving as a mark. The cylindrical tube may be made of glass, ceramic or metal material. The rod lens can be secured by using a bonding agent or by welding or soldering. At a step shown in FIG. 18C, the rod assembly is so positioned that the mark protrusion 83 lies on the Y—Y' axis and subsequently both end faces of the rod lens assembly are ground slant at desired angles $\theta_1$ and $\theta_3$, respectively. At a step illustrated in FIG. 18D, one of the end faces is formed with a dielectric thin-film filter 84 while the other end face is formed with an aniti-reflection film 85 for suppressing reflection.

Figure 19A:
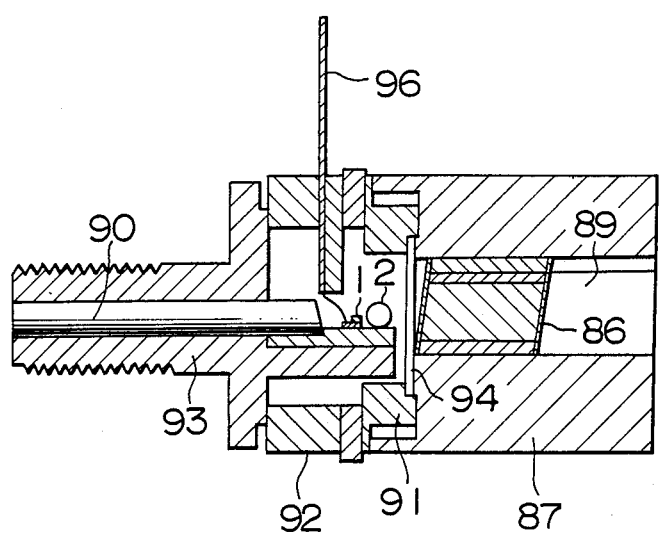
FIGS. 19A and 19B are views showing an optical module for a two-way optical transmission according to a further embodiment of the invention.
Figure 19B:
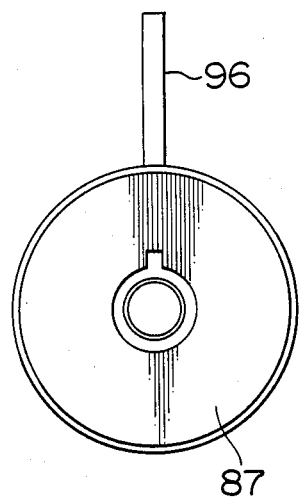
Figure 18A:
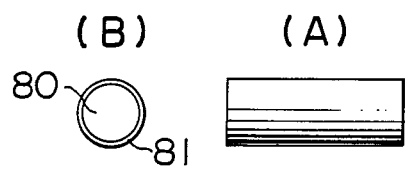
FIGS. 18A to 18D are views for illustrating stepwise formation of dielectric thin-film filters on ends of a rod lens inserted and secured within a cylindrical tube having a mark and subsequently ground slant according to the teaching of the invention.
Figure 18B:
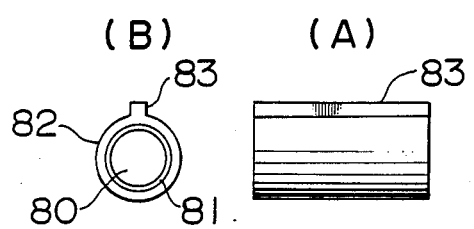
Figure 18C:
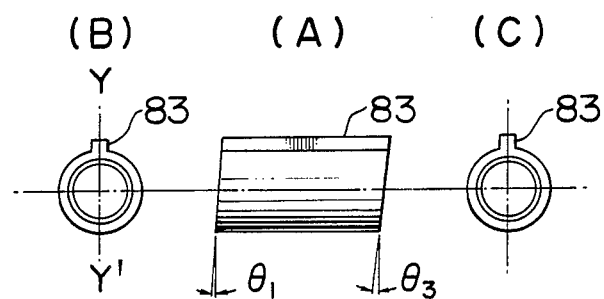
Figure 18D:
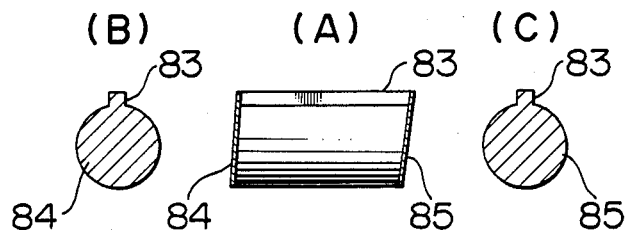

FIGS. 19A and 19B show an exemplary embodiment of the two-way optical transmission module which incorporates the rod lens provided with the enclosing tube shown in FIGS. 18A and 18D. In the figure, a reference numeral 86 denotes the rod lens fixedly accommodated within the cylindrical tube as shown in FIG. 18D, and 87 denotes a receiving base which is provided with a recess 89 for fitting therein the encased rod lens. In other words, the receiving base 86 is a female menber, so to say, while the encased rod lens constitutes a male member, whereby the assembling or packaging of both the members can be effectively carried out within a short time, advantageously for the manufacture on the mass production basis. A reference numeral 90 denotes a glass rod for deriving light signal for the purpose of monitoring. Numerals 91, 92 and 93 denote parts which constitute the package, 94 denotes an optical window and 96 denotes an electrode.

Figure 20A:
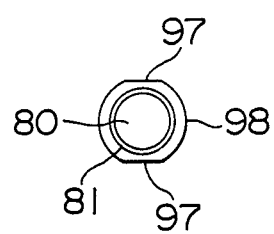
FIGS. 20A and 20B are views showing, respectively, a rod lens inserted in a cylindrical tube and a receiving element according to a still further embodiment of the invention.
Figure 20B:
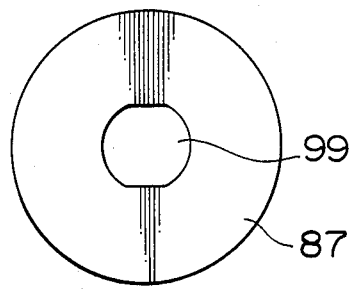
Figure 21A:
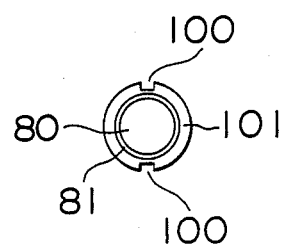
FIGS. 21A and 21B are views showing versions of the structures shown in FIGS. 20A and 20B.
Figure 21B:
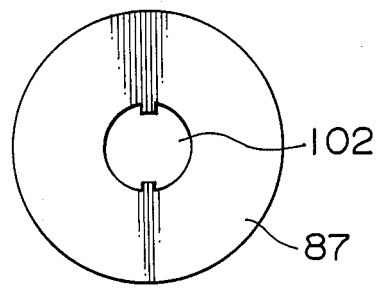

FIGS. 20A and 20B and FIGS. 21A and 21B show other embodiments of the rod lens encased within the cylindrical tube and the receiving base. More specifically, FIGS. 20A and 21A show end views of the tube-encased rod lenses, and FIGS. 20B and 21B show end views of the receiving bases or members. In the case of the embodiment illustrated in FIGS. 20A and 20B, flattened portions 97 serving for the positioning reference mark are formed in the cylindrical tube 98, while the receiving member 87 is formed with a recess or bore 99 which is adapted to receive snugly the cylindrical tube 98. On the other hand, in the case of the embodiment illustrated in FIGS. 21A and 21B, the cylindrical tube 101 is provided with a pair of diametrically opposite grooves 100 serving for the positioning mark, while the receiving base or member 87 is formed with a bore 102 of the same shape as the outer profile of the cylindrical tube 101.

Figure 22A:
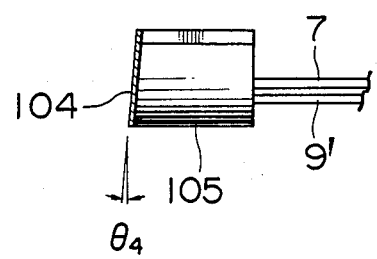
FIGS. 22A and 22B are views showing the optical fiber holder according to still another embodiment of the present invention.
Figure 22B:
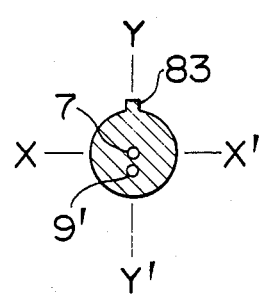

FIGS. 22A and 22B show another embodiment of the invention in which a protrusion 83 serving for the positioning mark is formed in a holder 105 used for securing the optical fibers 7 and 9'. The outer configuration of the holder 105 is so realized as to be snugly engaged in the bore 89 of the receiving base 87 shown in FIGS. 19A and 19B. A reference numeral 104 denotes an anti-reflection coating film. Since the optical fiber 9' is fixedly disposed on the Y—Y' axis, the light signal emitted by the semiconductor light emission element 1 can be coupled to the optical fiber 7 with an improved efficiency, while the light signal produced by the semiconductor light emission element 1" can be effectively coupled to the optical fiber 9', both couplings being realized in a facilitated manner.

Figure 23:
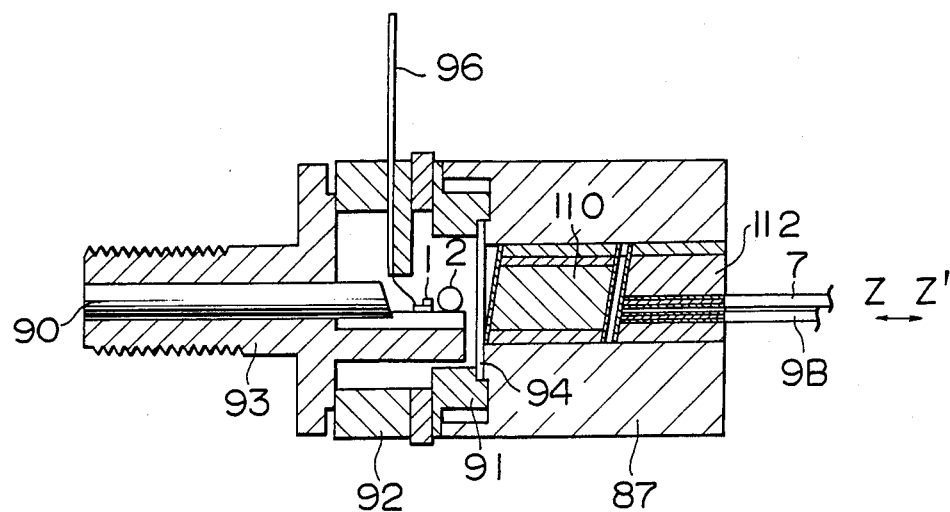
FIG. 23 is a view showing an optical module for the two-way optical transmission according to yet another embodiment of the invention.

FIG. 23 shows a two-way optical transmission module incorporating the tube-encased rod lens 110 shown in FIG. 18D and the optical fiber holder 112 according to still another embodiment of the present invention. Bacause the guiding mechanism is available, the optical coupling can be finely adjusted by moving the rod lens 110 and the holder 112 slightly in either direction Z or Z'. This structure also allows the time required for assembling to be shortened, while assuring cost reduction. This structure is also suited for the manufacturing on the mass production basis.

Figure 24A:
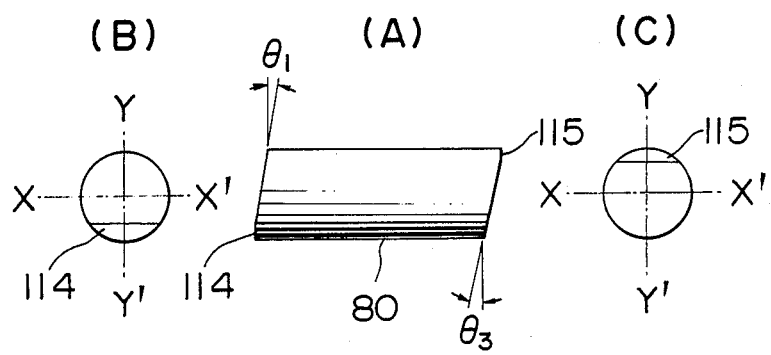
FIGS. 24A and 24B are views showing a structure of the rod lens attached with a mark.
Figure 24B:
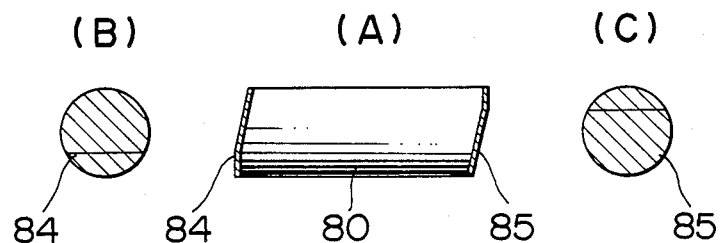

FIGS. 24A and 24B show another embodiment of the invention according to which the positioning marks are formed on the end faces of the rod lens. Referring to FIG. 24A, when the end faces of the rod lens 80 are ground slant along the Y—Y' axis at the desired angles $\theta_1$ and $\theta_3$, respectively, parts 114 and 115 are left unground to constitute the positioning reference marks. These portions 114 and 115 are selected at the regions of the associated end faces of the rod lens which are excluded from illumination by the light beam emitted by the semiconductor light emission element. The area of the mark may be about 10% of the whole area of the end face. Referring to FIG. 24B, these end faces are provided with a dielectric thin-film filter 84 and an anti-reflection film 85, respectively. By preparing the positioning marks in this way, the rod lens can be readily disposed at the desired position in the course of packaging.

FIG. 25 shows a two-way optical transmission system according to still another embodiment of the present invention. Referring to FIG. 25, optical transmitters 151 to 153 and an optical receiver 134 are disposed at one end of a single optical fiber 7 while an optical transmitter 154 and optical receivers 131 to 133 are disposed at the other or opposite end of the optical fiber 7. Each of the optical transmitters and the optical receivers is combined with an associated dielectric thin-film filter 201, . . . , or 208 and rod lens 301, . . . , or 308 to constitute a combined unit. One end of the optical fiber 7 is coupled with one of the combined units (the one including the optical transmitter 151 in the case of the illustrated embodiment) disposed at said one end of the optical fiber 7, while the other end thereof is coupled to a given one of the combined units (the one including the optical receiver 131 in the case of the illustrated embodiment) which are disposed on the side of said other end of the optical fiber 7. The rod lenses disposed at one end of the single optical fiber 7 are connected to cascade through optical fibers 401 to 404, and those rod lenses which are disposed at the other end of the single optical fiber are also connected in cascade through optical fibers 405 to 408.

The individual thin-film filters are imparted with such characteristics that they transmit therethrough the light signals of wavelengths which are emitted by the associated or combined optical transmitter or which are to be received by the associated optical receivers while reflecting the other irrelevant light signals. Accordingly, the light signal of wavelength $\lambda_1$ takes the course of 151-201-301-7-305-205-131. Similarly, the light signal of wavelength $\lambda_2$ follows the course of 152-203-303-402-302-202-302-401-301-201-301-7-305-205-305-405-306-206-306-406-307-207-132. The light signal of wavelength $\lambda_n$ follows the course of 153-204-304-404-403-303-203-303-402-302-202-302-401--

301-201-301-7-305-205-305-405-306-206-306-406-307-20-7-307-407-408-308-208-133. The light signal of wavelength $\lambda_m$ follows the course of 154-206-306-405-305-205-305-7-301-201-301-401-302-202-134.

One of the characteristic features of the illustrated embodiment resides in that no restriction is imposed at all on the order of arraying the optical transmitters and the optical receivers disposed at both ends of the optical fiber 7, respectively. For example, the combined unit including the optical transmitter 151 can be replaced by the combined unit including the optical receiver 134 with regard to the disposed location. In the similar manner, the combined units including the optical transmitters or optical receivers, respectively, and disposed on the same side of the single optical fiber can be interchanged with one another with respect to the disposed location. Of course, the paths followed by the light signals of different wavelengths will be correspondingly changed. However, no problem arises with regard to the essence of the two-way optical transmission. Rather, there will be obtained advantages mentioned below. That is, the individual combined units including the optical transmitters or optical receivers, respectively, can be realized in the module of a same structure except for the dielectric thin-film filters which differ from one to another module. Further, any given combined unit including an optical transmitter or an optical receiver designed for dealing with a given wavelength can be added or removed merely by connecting or disconnecting the optical fiber to or from the rod lens of the combined unit in concern. In this manner, expansion or contraction of the system can be accomplised in a facilitated manner.

The present invention is not restricted to the disclosed embodiments. The semiconductor light emission element may be either a semiconductor laser or a light emission diode. The optical fiber may be of a single mode optical fiber or a multi-mode optical fiber. In place of the rod lens, an indexgraded slab lens may be used. The invention may be applied to the transmission of three or more light signals in addition to the transmission of two light signals.

As will be appreciated, by providing the mark which indicates that the dielectric thin-film filter is formed on the end face of the rod lens at a desired angle along the Y—Y' axis, the optical coupling of the rod lens to two optical fibers can be easily accomplished, whereby the time required for the assembling as well as the manufacturing cost can be significantly reduced. By providing the optical fiber holder and the receiving base which are adapted to be packaged or assembled with reference to the mark, the adjustment of the optical axis is facilitated. Further, the optical module is suited to be manufactured on the mass-production basis, because of the simplified process of securing the rod lens within a cylindrical tube provided with a mark, grinding slant the rod lens in the state encased within the cylindrical tube, forming the dielectric thin-film filter and finally packaging the assembly.

We claim:

1. A two-way optical transmission system in which a plurality of light signals of wavelengths differing one from another are transmitted through a single optical fiber from one end thereof to the other end and from said other end to said one end, comprising:

first optical transmitter means for converting first input information into a first light signal of wavelength $\lambda_1$ and sending out said first light signal;

second optical transmitter means for converting second input information into a second light signal of wavelength $\lambda_2$ and outputting said second light signal;

a first combination of a first dielectric thin-film filter and a first rod lens interposed between said one end of said single optical fiber and said first optical transmitter means, said first dielectric thin-film filter transmitting therethrough said first light signal of wavelength $\lambda_1$ and reflecting said second light signal of wavelength $\lambda_2$, said first rod lens having one end facing said one end of said optical fiber;

a second combination of a second dielectric thin-film filter and a second rod lens interpoed between said other end of said single optical fiber and said second optical transmitter means, said second dielectric thin-film filer transmitting therethrough said second light signal of wavelength $\lambda_2$ and reflecting said first light signal of wavelength $\lambda_1$, said second rod lens having one end facing said other end of said optical fiber;

first optical receiver means for receiving said first light signal of wavelength $\lambda_1$ reflected by said second dielectric thin-film filter by way of the one end of said second rod lens and converting said first light signal into said first information; and second optical receiver means for receiving said second light signal of wavelength $\lambda_2$ reflected by said first dielectric thin-film filter by way of the one end of said first rod lens and converting said second light signal into said second information, wherein each of said first and second transmitter means has a light emission element and a spherical lens, each of said first and second dielectric thin-film filters is provided with an angle at an end face of the corresponding rod lens which is located on the entrance side of light emitted by the light emission element, the length of each of said first and second rod lenses is about n/4 pitch (where n=1, 3, 5, . . . ), and each of said first and second transmitter means and the corresponding filter and rod lens are integrally assembled in a single receptacle to thereby constitute an optical module.

2. A two-way optical transmission system according to claim 1, wherin the one end of said second rod lens is connected with said first optical receiver means through a first optical fiber, and the one end of said first rod lens is connected with said second optical receiver means through a second optical fiber.

3. A two-way optical transmission system according to claim 1, wherein each of said first and second dielectric thin-film filters reflects a third light signal of wavelength $\lambda_3$, further comprising:

third optical transmitter means for converting third input information into said third light signal of wavelength $\lambda_3$ and outputting said third light signal;

a third combination of a third dielectric thin-film filter, a third rod lens and a third optical fiber, said third combination being interposed between said third optical transmitter means and the one end of said first rod lens, said third dielectric thin-film filter transmitting therethrough said third light signal of wavelength $\lambda_3$ and reflecting said second light signal of wavelength $\lambda_2$, said third optical fiber having one end facing the one end of said first rod lens and having the other end facing one end of said third rod lens, said second optical receiver means receiving said second light signal of wavelength $\lambda_2$ reflected by said third dielectric thin-film filter by way of said one end of said third rod lens;

third optical receiver means for receiving said third light signal of wavelength $\lambda_3$ and converting said third light signal into said third information;

a fourth combination of a fourth dielectric thin-film filter, a fourth rod lens and a fourth optical fiber, said fourth combination being interposed between said third optical receiver means and the one end of said second rod lens, said fourth dielectric thin-film filter transmitting therethrough said third light signal of wavelength $\lambda_3$ and reflecting said second light signal of wavelength $\lambda_2$, said fourth optical fiber having one end facing the one end of said second rod lens and having the other end facing one end of said fourth rod lens, said first optical receiver means receiving said first light signal of wavelength $\lambda_1$ reflected by said fourth dielectric thin-film filter by way of the one end of said fourth rod lens.

4. A two-way optical transmission system according to claim 3, wherein the one end of said fourth rod lens is connected with said first optical receiver means through said fourth optical fiber, and the one end of said third rod lens is connected with said second optical receiver means through said third optical fiber.

5. A two-way optical transmission system according to claim 1, 2, 3 or 4, wherein at least one of said rod lenses is composed of two parts, and said dielectric thin-film filter associated with said one rod lens is disposed between said two parts.

6. A two-way optical transmission system according to claims 1, 2, 3 or 4, wherein at least one of said dielectric thin-film filters is formed on a surfaceof a glass spacer.

7. A two-way optical transmission system in which a plurality of light signals of wavelengths differeing one from another are transmitted through a single optical fiber from one end thereof to the other end and from said other end to said one end, comprising:

at least two optical transmitter means disposed, respectively, on both ends of said single optical fiber for transmitting light signals of mutually different wavelengths;

at least two optical receiver means disposed, respectively, on both ends of said single optical fiber for receiving the light signals from said at least two optical transmitter means;

combinations each composed of a dielectric thin-film filter and a rod lens and disposed, respectively, between the ends of said single optical fiber and said at least two optical transmitter means, each of said dielectric thin-film filters transmitting therethrough the light signal of the wavelength transmitted by the associated optical transmitter means and reflecting the light signal of the wavelength transmitted by the counterpart optical transmitter means, each of said rod lenses having one end facing the end of said single optical fiber, said optical receiver means receiving the light signals reflected by said dielectric thin-film filters by way of said one ends of said rod lenses, respectively wherein each of said transmitter means has a light emission element and a spherical lens, each of said dielectric thin-film filters is provided with an angle at an end face of the corresponding rod lens which is located on the entrance side of light emited by the light emission element, the length of each of said rod lenses is about n/4 pitch (where n=1, 3, 5 . . . ), and each of said transmitter means and the corresponding filter and rod lens are integrally assembled in a single receptacle to thereby constitute an optical module.

8. A two-way optical transmission system in which three or more light signals of wavelengths differing one from another are transmitted through a single optical fiber from one end thereof to the other end and from said other end to said one end, comprising:

at least two optical transmitter means disposed, respectively, on both ends of said single optical fiber for transmitting the lightsignal of mutually different wavelenths, respectively;

combinations each of a rod lens and n dielectric thin-film filters (where $n \geq 2$) an disposed, respectively, between the ends of said single optical fiber and said optical transmitter means, each of said dielectric thin-film filters transmitting therethrough the light signal of a specific wavelength and reflecting the light signals of the other wavelengths, each of said rod lenses having one end facing one end of said single optical fiber;

n optical fibers disposed at each of said one ends of said rod lenses and having respective one ends facing the one end of each rod lens in corresponding relation with said n dielectric thin-film filters, respectively, while the other ends of a pair of said n optical fibers being connected to optical receiver means for receiving the optical signals of different wavelengths transmitted from said two optical transmitter means, respectively, to (n−1) optical transmitter means for transmitting wavelengths differing from the wavelengths from said two optical transmitter means and to (n−1) optical receiver means for receiving the light signals of wavelengths transmitted from said (n−1) optical transmitter/means, wherein each of said transmitter means has a light emission element and a spherical lens, each of said dielectric thin-film filters is provided with an angle at an end face of the corresponding rod lens which is located on the entrance side of light emitted by the light emission element, the length of each of said rod lenses is about n/4 pitch (where n=1, 3, 5, . . . ), and each of said transmitter means and the corresponding filter and rod lens are integrally assembled in a single receptacle to thereby constitute an optical module.

9. A two-way optical transmisson system according to claim 8, wherein both ends of said single optical fiber are disposed on the center axes of said rod lenses, respectively.

10. A two-way optical transmission system according to claim 8, wherein at least one of said dielectric thin-film filters is formed on a surface of a glass spacer.

11. A two-way optical transmission system according to claim 10, wherein a space is provided between said glass spacer and the associated one of said rod lenses.

12. A two-way optical transmission system according to claim 8, 9, 10 or 11, wherein said n optical fibers have respective end faces provided with the dielectric thin-film filters which pass the specific wavelengths, respectively.

13. A two-way optical transmission system according to claim 8, 9, 10 or 11, wherein each of said rod lenses has one end face bevelled at a predetermined angle relative to a plane perpendicular to the axial direction of said rod lens.

14. A two-way optical transmission system according to claim 13, wherein the one end face of said rod lens bevelled at said predetermined angle is applied with an anti-reflection coating.

15. A two-way optical transmission system according to any one of preceding claims 2 to 4 and 8 to 11, wherein optical fiber holders are disposed between said rod lenses and a plurality of said optical fibers facing said rod lenses.

16. A two-way optical transmission system according to claim 15, wherein a face of said optical fiber holder located on the side of said rod lens is bevelled at a predetermined angle relative to a plane perpendicular to the axial direction of said rod lens.

17. A two-way optical transmission system according to claim 15, wherein each of said optical transmitter means constitutes an optical module comprising at least one of said dielectric thin-film filters, rod lenses and optical fiber holders which are integrally assembled in a single receptacle, to thereby constitute an optical module for the two-way optical transmission, and wherein said optical module has a rod of glass for monitoring light of a light emission element included in said optical transmitter means.

18. An optical module for two-way transmission, comprising:
   an electrode for receiving an input electrical signal supplied externally;
   a light emission element connected to said electrode and converting said electric signal into a light signal;
   lens for collimating the light signal emitted by said light emission element;
   an optical window for transmitting therethrough the light signal from said lens;
   at least one dielectric thin-film filter for transmitting te light signal from said optical window;
   a rod lens for sending out the light signal transmitted through said dielectric thin-film filter to an optical fiber;
   a receiving base for securing said rod lens and having an aperture for receiving therein an optical fiber holder; and wherein said at least one dielectric thin-film filter is provided with an angle at an end face of the corresponding rod lens which is located on the entrance side of said light signal, and the length of said rod lens is about n/4 pitch (where n=1, 3, 5, ... ).

19. An optical module for two-way tansmission according to claim 18, wherein said rod lens is inserted into a tube which has a mark for facilitating packaging, said receiving base being provided with a guide corresponding to said mark.

20. A two-way optical transmission system in which a plurality of light signals of wavelengths differing one from another are transmitted through a single optical fiber from one end thereof to the other end and from said other end to said one end, comprising:
   n (where n represents a natural number) first combined units each comprising optical transmitter means for outputting a light signal of wavelength $\lambda_i$ (i=1, 2, ... or n), a dielectric thin-film filter for transmitting therethrough the light signal of the wavelength $\lambda_i$ and reflecting the light signals of the other wavelengths and a rod lens for introducing the light signal transmitted through or reflected by said dielectric thin-film filter into an optical fiber;
   m (where m is a natural number) second combined units each comprising optical transmitter means for outputting a light signal of wavelength $\lambda_j$ (j=1, 2, ... or m), a dielectric thin-film filter for transmitting therethrough the light signal of the wavelength $\lambda_j$ and reflecting light signals of the other wavelengths and a rod lens for introducing the light signal transmitted through or reflected by said dielectric thin-film filter into an optical fiber;
   n third combined units each comprising a rod lens for fetching the light signal of the wavelength $\lambda_i$ from the optical fiber, a dielectric thin-film filter for transmitting therethrough the light signal of the wavelength $\lambda_i$ and reflecting the light signals of the other wavelengths and optical receiver means for receiving the light signal of the wavelength $\lambda_i$ transmitted through said dielectric thin-film filter;
   m fourth combined units each comprising a rod lens for fetching the light signal of the wavelength $\lambda_j$ from the optical fiber, a dielectric thin-film filter for transmitting therethrough the light signal of the wavelength $\lambda_j$ and reflecting the light signals of the other wavelengths, and an optical receiver means for receiving the light signal of the wavelength $\lambda_j$ transmitted through said dielectric thin-film filter;
   wherein said n first combined units and said m fourth combined units are disposed on the side of the one end of said single optical fiber, one end of a given one of said rod lenses of said first and fourth combined units facing one end of said single optical fiber, and the rod lenses of said first and said fourth combined units are connected in cascade through optical fibers;
   said m second combined units and said n third combined units being disposed on the side of the other end of said single optical fiber, one end of a given one of said second and third combined units facing the one end of said single optical fiber, and the rod lenses of said second and third combined units being connected in cascade through optical fibers;
   wherein each of said transmitter means has a light emission element and a spherical lens, each of said dielectric thin-film filters is provided with an angle at an end face of the corresponding rod lens which is located on the entrance side of light emitted by the light emission element, the length of each of said rod lenses is about n/4 pitch (where n=1, 3, 5, ... ), and each of said transmitter means and the corresponding filter and rod lens are integrally assembled in a single receptacle to thereby constitute an optical module.

* * * * *